US012230997B2

(12) United States Patent
Morita

(10) Patent No.: US 12,230,997 B2
(45) Date of Patent: Feb. 18, 2025

(54) REDUNDANT POWER SYSTEM

(71) Applicant: DENSO CORPORATION, Kariya (JP)

(72) Inventor: Tetsuo Morita, Kariya (JP)

(73) Assignee: DENSO CORPORATION, Kariya (JP)

( * ) Notice: Subject to any disclaimer, the term of this patent is extended or adjusted under 35 U.S.C. 154(b) by 178 days.

(21) Appl. No.: 17/991,412

(22) Filed: Nov. 21, 2022

(65) Prior Publication Data

US 2023/0104265 A1 Apr. 6, 2023

Related U.S. Application Data

(63) Continuation of application No. PCT/JP2021/017495, filed on May 7, 2021.

(30) Foreign Application Priority Data

May 22, 2020 (JP) ................................ 2020-089584
Sep. 3, 2020 (JP) ................................ 2020-148347

(51) Int. Cl.
*H02J 9/06* (2006.01)
*H02J 7/00* (2006.01)

(52) U.S. Cl.
CPC ............ *H02J 9/061* (2013.01); *H02J 7/0069* (2020.01)

(58) Field of Classification Search
CPC .................. H02J 9/061; H02J 7/0069

USPC .................................................. 307/23, 10.1
See application file for complete search history.

(56) References Cited

U.S. PATENT DOCUMENTS

| 2009/0179627 A1* | 7/2009 | Innami ..................... H02J 7/345 323/318 |
| 2012/0019190 A1* | 1/2012 | Jones ........................ H02J 7/34 320/101 |
| 2018/0334037 A1 | 11/2018 | Masui et al. |
| 2020/0216002 A1 | 7/2020 | Mazaki et al. |
| 2020/0313457 A1* | 10/2020 | Kozuki ................. H02J 7/0068 |

* cited by examiner

*Primary Examiner* — Michael R. Fin
(74) *Attorney, Agent, or Firm* — Oliff PLC

(57) ABSTRACT

A power system has: an electrical load; first and second lines respectively including first and second power sources; and inter-line switch. The first power source outputs a power supply voltage. The second power source includes a storage battery. The power system includes: an anomaly determination unit determining an anomaly in the first line; a state control unit opening the inter-line switch if the occurrence of an anomaly is determined; first and second paths in parallel to each other between a connection point to the connection path and the second power source in the second line; a charging unit on the first path to charge the storage battery to a higher voltage than the power supply voltage of the first power source; and a discharge regulation unit on the second path to regulate discharge of the storage battery in the second line.

15 Claims, 21 Drawing Sheets

REDUNDANT POWER SYSTEM

CROSS-REFERENCE TO RELATED APPLICATION

This application is the U.S. bypass application of International Application No. PCT/JP2021/017495 filed on May 7, 2021, which designated the U.S. and claims priority to Japanese Patent Application No. 2020-089584 filed on May 22, 2020 and Japanese Patent Application No. 2020-148347 filed on Sep. 3, 2020, the contents of all of which are incorporated herein by reference.

TECHNICAL FIELD

The present disclosure relates to a power system.

BACKGROUND

In recent years, there have been known power systems that are applied to a vehicle, for example, and supply electrical power to various devices in the vehicle. In such a power system, during driving of the vehicle, if an anomaly occurs in a line that supplies power to electrical loads that perform functions necessary for driving of the vehicle, such as an electric brake device and an electric steering device, for example, and the functions are lost due to the anomaly, the driving of the vehicle cannot be continued. As a measure for preventing the functions from being lost even in the event of an anomaly during driving of the vehicle, there is known a device including a first power source and a second power source as power sources that supply power to the electrical loads.

SUMMARY

A power system according to a first aspect of the present disclosure includes: an electrical load: a first line that includes a first power source connected to the electrical load; a second line that includes a second power source connected to the electrical load; and an inter-line switch that is provided on a connection path connecting the first line and the second line, wherein the first power source outputs a power supply voltage that enables driving of the electrical load, the second power source includes a storage battery that is chargeable by the power supply voltage of the first power source, and the power system further includes: an anomaly determination unit that determines occurrence of an anomaly in the first line; a state control unit that opens the inter-line switch if the anomaly determination unit determines the occurrence of an anomaly; a first path and a second path that are provided in parallel to each other between a connection point to the connection path and the second power source in the second line; a charging unit that is provided on the first path to charge the storage battery to a higher voltage than the power supply voltage of the first power source by power supply from the first power source: a discharge regulation unit that is provided on the second path to regulate discharge of the storage battery in the second line; and the discharge regulation unit includes a rectifier element that regulates the flow of current from the connection point to the storage battery on the second path and generates a predetermined voltage difference between the voltage of the storage battery and the power supply voltage.

BRIEF DESCRIPTION OF THE DRAWINGS

The above features of the present disclosure will be made clearer by the following detailed description, given referring to the appended drawings. In the accompanying drawings.

DETAILED DESCRIPTION OF THE PREFERRED EMBODIMENTS

Figure 1:
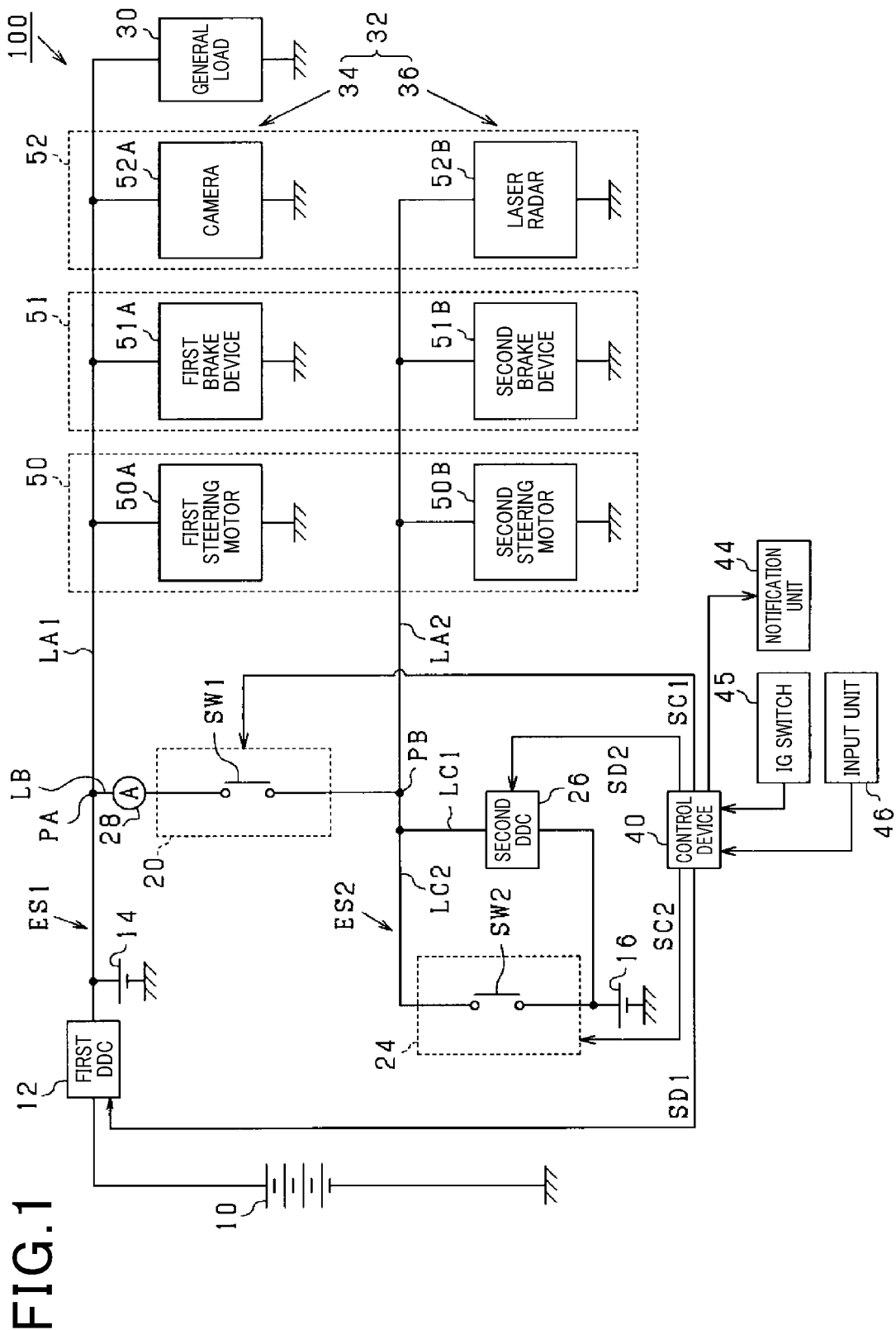
FIG. 1 is a general configuration diagram of a power system in a first embodiment.

As a power system applied to a device including a first power source and a second power source as power sources that supply power to the electrical loads, there is known a power system described in JP 2019-62727 A, for example, that has a first load and a second load as electrical loads performing one function and has a first line including a first power source connected to the first load and a second line including a second power source connected to the second load. In this power system, an inter-line switch is provided on a connection path connecting the lines. The inter-line switch is opened if a controller determines that there has occurred an anomaly in one of the lines. Accordingly, it is possible to secure the functions necessary for driving the vehicle by the electrical load in the other line without an anomaly and continue the driving of the vehicle.

The foregoing power system may be configured such that the second power source in the second line is a storage battery. In this configuration, if the inter-line switch is opened due to the occurrence of an anomaly in the first line, for example, power is supplied from the storage battery that is the second power source. However, in a low-temperature state or a heavily loaded state, for example, the voltage required at the electrical load becomes high and thus there is concern that the electrical load may not operate properly at the start of power supply from the storage battery in the second line.

The present disclosure is made for solving the foregoing issue. An object of the present disclosure is to provide a power system having a plurality of power lines that can properly supply power to electrical loads in the power system.

A power system according to a first aspect of the present disclosure includes: an electrical load: a first line that includes a first power source connected to the electrical load: a second line that includes a second power source connected to the electrical load; and an inter-line switch that is provided on a connection path connecting the first line and the second line, wherein the first power source outputs a power supply voltage that enables driving of the electrical load, the second power source includes a storage battery that is chargeable by the power supply voltage of the first power source, and the power system further includes: an anomaly determination unit that determines occurrence of an anomaly in the first line: a state control unit that opens the inter-line switch if the anomaly determination unit determines the occurrence of an anomaly: a first path and a second path that are provided in parallel to each other between a connection point to the connection path and the second power source in the second line: a charging unit that is provided on the first path to charge the storage battery to a higher voltage than the power supply voltage of the first power source by power supply from the first power source: a discharge regulation unit that is provided on the second path to regulate discharge of the storage battery in the second line; and the discharge regulation unit includes a rectifier element that regulates the flow of current from the connection point to the storage battery on the second path and generates a predetermined voltage difference between the voltage of the storage battery and the power supply voltage.

According to the foregoing configuration, the first line including the first power source and the second line including the second power source are provided. This enables redundant power supply to the electrical load by the first power source and the second power source. The inter-line switch is provided on the connection path connecting the first and second lines. Accordingly, if it is determined that an anomaly has occurred in either one of the lines, the inter-line switch can be opened to continue the operation of the electrical load by power supply from the power source in the other line without an anomaly.

If the inter-line switch is opened due to the occurrence of an anomaly in the first line, for example, power is supplied from the storage battery that is the second power source in the second line. However, in a low-temperature state or a heavily loaded state, for example, the voltage required at the electrical load becomes high, and thus there is concern that the electrical load may not operate properly at the start of power supply from the storage battery in the second line.

In this respect, in the foregoing configuration, the first path and the second path are provided in parallel to each other between the connection point to the connection path and the second power source in the second line. On the first path, the storage battery is being charged by the charging unit with the power supply from the first power source at a higher voltage than the power supply voltage of the first power source. On the second path, the discharge regulation unit regulates discharge of the storage battery in the second system. In this case, when power is supplied from the storage battery in the second line due to the occurrence of an anomaly in the first line, the storage battery as the second power source is being charged at a higher voltage than the power supply voltage of the first power source so that the electrical load can be operated properly even under a low-temperature environment. Since the discharge regulation unit is provided in parallel to the charging unit, unnecessary discharge of the storage battery is regulated even if the storage battery as the second power source is higher in voltage than the first power source. Accordingly, it is possible to perform proper power supply to the electrical load in the power system having a plurality of power source lines.

Further, in the foregoing configuration, the rectifier element is provided as the discharge regulation unit, and the rectifier element regulates the flow of current from the connection point to the storage battery on the second path, and generates a predetermined voltage difference between the voltage of the storage battery and the power supply voltage. Accordingly, the storage battery is maintained at a higher voltage than the power supply voltage of the first power source, and discharge of the storage battery is regulated. In the event of an anomaly in the first line, the storage battery is discharged due to a decrease in the voltage of the electrical load in the second line, thereby enabling early power supply to the electrical load.

In a second aspect, the voltage difference generated by the rectifier element is variable in the discharge regulation unit, the power system includes a voltage difference switch unit that switches the voltage difference based on the difference between the voltage of the connection point and the voltage of the storage battery, and the voltage difference switch unit sets the voltage difference to a larger value as the difference between the voltage of the connection point and the voltage of the storage battery is larger.

If no anomaly has occurred in the first line, that is, if the voltage in the first system is normal, the voltage of the connection point and the voltage of the storage battery in the second line are held with a difference that is defined by the voltage difference generated by the rectifier element. In that state, the discharge from the storage battery to the connection point is regulated. However, the voltage of the storage battery varies depending on the surrounding temperature and degree of degradation of the storage battery, for example, and the voltage of the connection point varies depending on the amount of driving the electrical load. In this case, if the voltage difference generated by the rectifier element takes on a constant value, the voltage difference may be smaller or larger than the difference between the voltage of the connection point and the voltage of the storage battery. If the voltage difference is smaller than the difference between the voltage of the connection point and the voltage of the storage battery, there is concern that unnecessary discharge of the storage battery cannot be regulated. On the other hand, if the voltage difference is larger than the difference, when power is supplied from the storage battery in the second line due to the occurrence of an anomaly in the first line, there is concern that the voltage to be applied to the electrical load may decrease due to the excessive potential difference generated by the rectifier element and the electrical load may not properly operate at the start of power supply from the storage battery in the second line.

In this respect, in the foregoing configuration, the voltage difference generated by the rectifier element is variable, and the voltage difference is switched based on the difference between the voltage of the connection point and the voltage of the storage battery. More specifically, the voltage difference is set to be a larger value as the difference between the voltage of the connection point and the voltage of the storage battery is larger. Accordingly, if the difference between the voltage of the connection point and the voltage of the storage battery is large, the voltage difference can be set to a large value, and if the difference between the voltage of the connection point and the voltage of the storage battery is small, the voltage difference can be set to a small value, so that it is possible to properly supply power to the electrical load.

In a third aspect, the discharge regulation unit has a plurality of diodes connected in series as the rectifier element, and the voltage difference switch unit switches the voltage difference by changing the number of diodes that are to be conductive among the plurality of diodes between the connection point and the storage battery.

In the foregoing configuration, the plurality of diodes connected in series is provided as the rectifier element, and the voltage difference is switched by changing the number of diodes that becomes conductive among the plurality of diodes. Among the plurality of diodes connected in series, a voltage difference between the rectifier elements is generated due to the forward voltages of the conductive diodes. Thus, the voltage difference among the rectifier elements can be switched by changing the number of diodes to be conductive.

In a fourth aspect, the discharge regulation unit has a plurality of diodes that is connected in parallel to one another and is different in forward voltage as the rectifier element, and the voltage difference switch unit switches the voltage difference by changing the number of diodes that become conductive among the plurality of diodes connected in parallel.

In the foregoing configuration, the plurality of diodes connected in parallel to each other and different in forward voltage is provided as the rectifier element. The voltage difference is switched by changing the number of diodes that become conductive among the plurality of diodes. Since the plurality of diodes connected in parallel to each other is different in forward voltage, a voltage difference occurs among the rectifier elements due to the forward voltages of the conductive diodes. Thus, the voltage difference among the rectifier elements can be switched by changing the number of diodes that become conductive.

In a fifth aspect, a semiconductor switching element having a parasitic diode is provided on the second path, the parasitic diode is the rectifier element, and in response to the anomaly determination unit determining that there has occurred an anomaly, the state control unit brings the semiconductor switching element into the conductive state.

In a configuration in which the parasitic diode of the semiconductor switching element is used as the rectifier element, in the event of an anomaly in the first line, power can be supplied from the storage battery to the electrical load via the parasitic diode. However, there is concern that the parasitic diode may generate heat due to power distribution. In this respect, in the foregoing configuration, in the event of an anomaly in the first line, the semiconductor switching element is brought into the conductive state to suppress heat generation by the parasitic diode while enabling early power supply to the electrical load via the parasitic diode.

In a sixth aspect, the second path includes a first regulation path and a second regulation path that are provided in parallel to each other, the first regulation path is provided with the rectifier element, the second regulation path is provided with a regulation switch that opens or closes the second regulation path, and in response to the anomaly determination unit determining that there has not occurred an anomaly, the state control unit closes the inter-line switch and opens the regulation switch, and in response to the anomaly determination unit determining that there has occurred an anomaly, the state control unit first opens the inter-line switch and then closes the regulation switch.

In a configuration in which a rectifier element is used as a discharge regulation unit, in the event of an anomaly in the first line, it is possible to supply power from the storage battery to the electrical load via the rectifier element, but the voltage of the electrical load decreases due to the voltage difference generated by the rectifier element. In this respect, in the foregoing configuration, in the event of an anomaly in the first line, the inter-line switch is first opened and then the regulation switch is closed to suppress voltage decrease by the rectifier element while enabling early power supply to the electrical load by the rectifier element.

In a seventh aspect, there is provided a charge permission unit that is connected in parallel to the regulation switch, regulates the flow of current from the storage battery to the connection point on the second regulation path, and permits the flow of current from the connection point to the storage battery.

The voltage generated in the electrical load varies depending on the amount of driving the electrical load. Therefore, if the amount of driving the electrical load temporarily decreases, the voltage generated in the electrical load may rise excessively. If the voltage generated in the electrical load rises excessively, the overvoltage is desirably absorbed by the storage battery. However, in a configuration in which the first path is provided with the charging unit and the second path is provided with the rectifier element, the flow of current from the connection point to the storage battery via the charging unit and the rectifier element is regulated so that the overvoltage cannot be absorbed by the storage battery. In this respect, in the foregoing configuration, the second regulation path without the rectifier element in the second path is provided with the charging permission unit that is connected in parallel to the second regulation switch, regulates the flow of current from the storage battery to the connection point on the second regulation path, and permits the flow of current from the connection point to the storage battery. Thus, if the voltage generated in the electrical load rises excessively in the state in which the second regulation switch is closed, it is possible to cause the storage battery to absorb the overvoltage via the charging permission unit.

In an eighth aspect, the charging permission unit permits the flow of current from the connection point to the storage battery at an overvoltage time at which the voltage of the electrical load exceeds an upper limit value of the power supply voltage.

According to the foregoing configuration, due to the rise of the voltage generated in the electrical load, if there occurs an overvoltage time at which the voltage of the electrical load exceeds the upper limit value of the power supply voltage enabling the driving of the electrical load, it is possible to cause the storage battery to absorb the overvoltage via the charging permission unit.

In a ninth aspect, in the power system installed in a vehicle, the electrical load includes a steering load that controls steering of the vehicle, and the overvoltage time includes a driving time of the steering load.

According to the foregoing configuration, at the overvoltage time when the amount of driving the steering load temporarily decreases at the driving time of the steering load, it is possible to cause the storage battery to absorb the overvoltage.

In a tenth aspect, the storage battery is a second-line storage battery, the first power source includes: a voltage generation unit that generates the power supply voltage; and a first-line storage battery that is chargeable by the power supply voltage of the voltage generation unit, and the overvoltage time includes a switching time of the first-line storage battery from a state of being connected to the first line to a state of being disconnected from the first line.

In a configuration where the first path is provided with the charging unit and the second path is provided with the rectifier element and the regulation switch, when the regulation switch is opened, the power supply from the second power source is regulated, and thus redundant power supply is performed by the voltage generation unit and the first-line storage battery in the first power source. That is, the power supply from the voltage generation unit enables continuous power supply even during driving for extended periods, and the power supply from the first-line storage battery enables power supply with small voltage fluctuation. In this case, if the first-line storage battery is switched from the state of being connected to the first line to the state of being disconnected from the first line, the voltage fluctuation in the power supply becomes large and the voltage of the electrical load may excessively rise to an overvoltage. According to the foregoing configuration, if the first-line storage battery is switched to the disconnected state, it is possible to cause the storage battery to absorb the overvoltage via the charging permission unit.

In an eleventh aspect, the regulation switch has a first changeover switch and a second changeover switch connected in series, the charging permission unit is connected in parallel to only the first changeover switch, and in response to the anomaly determination unit determining that there has not occurred an anomaly and the storage battery is not being charged by the power supply voltage of the first power source, the state control unit opens the regulation switch by opening the first changeover switch and closing the second changeover switch, and in response to the anomaly determination unit determining that there has not occurred an anomaly and the storage battery is being charged by the power supply voltage of the first power source, the state control unit opens the regulation switch by opening the first changeover switch and the second changeover switch.

If it is determined that there has not occurred an anomaly in the first line, the storage battery is being charged as appropriate by the power supply voltage of the first power source, and the charging of the storage battery is regulated by the regulation switch. However, in a configuration in which the charging permission unit is connected in parallel to the regulation switch, there is concern that the charging of the storage battery may not be regulated by the regulation switch. In this respect, in the foregoing configuration, as the regulation switch, the first changeover switch and the second changeover switch connected in series are provided, and the charging permission unit is connected in parallel to only the first changeover switch. If the storage battery is not being charged, the first changeover switch is opened and the second changeover switch is closed, and if the storage battery is being charged, the first changeover switch and the second changeover switch are opened. That is, if the storage battery is not being charged, the charging by the charging permission unit is permitted, and if the storage battery is being charged, the charging by the charging permission unit is regulated by the second changeover switch. Accordingly, it is possible to properly regulate the charging of the storage battery while enabling the absorption of the overvoltage by the storage battery.

In a twelfth aspect, the regulation switch is a first regulation switch, the first regulation path is provided with a second regulation switch that is connected in series to the rectifier element to open or close the first regulation path, and in response to the anomaly determination unit determining that there has not occurred an anomaly and the storage battery is not being charged by the power supply voltage of the first power source, the state control unit closes the second regulation switch, and in response to the anomaly determination unit determining that there has not occurred an anomaly and the storage battery is being charged by the power supply voltage of the first power source, the state control unit opens the second regulation switch.

If it is determined that there has not occurred an anomaly in the first line, the storage battery is being charged as appropriate by the power supply voltage of the first power source. However, if the voltage of the storage battery rises temporarily at the start of charging of the storage battery, for example, there is concern that the storage battery being charged may be discharged via the rectifier element. In this respect, in the foregoing configuration, the second regulation switch is connected in series to the rectifier element. If the storage battery is not being charged, the second regulation switch is closed, and if the storage battery is being charged, the second regulation switch is opened. That is, if the storage battery is not being charged, the discharge by the rectifier element is permitted, and if the storage battery is being charged, the discharge by the rectifier element is regulated. Accordingly, it is possible to suppress the discharge of the storage battery being charged while enabling early power supply to the electrical load by the rectifier element.

In a thirteenth aspect, the charging unit is a booster circuit that boosts the power supply voltage, and the power system includes a boost control unit that causes the booster circuit to boost the voltage if a boost condition indicating the necessity of bringing the storage battery into a high voltage is satisfied.

In a configuration in which the storage battery of the second power source is made higher than the power supply voltage of the first power source by the charging of the charging unit, it is possible to properly supply power from the storage battery to the electrical load in the event of an anomaly in the first line. However, there is concern that electrical energy may be excessively used in a situation in which the first line is maintained in the normal state. In this respect, the booster circuit is caused to boost the voltage to charge the storage battery only if the boost condition is satisfied, so that it is possible to suppress the excessive use of electrical energy.

In a fourteenth aspect, the boost control unit changes degree of boosting by the booster circuit in accordance with a surrounding temperature of the power system.

For example, if the power system is in a predetermined low-temperature state, it is considered that a high voltage is required to operate the electrical load in supplying power from the storage battery to the electrical load. In this respect, the degree of boosting the voltage by the booster circuit is changed in accordance with the surrounding temperature of the power system, so that it is possible to properly the voltage of the storage battery as necessary.

In a fifteenth aspect, in the power system installed in a vehicle, the electrical load is a load that performs at least one function necessary for driving the vehicle and is a load that performs a driving assistance function of the vehicle, the vehicle is capable of driving in a first mode using the driving assistance function and driving in a second mode not using the driving assistance function, and if the driving mode of the vehicle is the first mode, the boost control unit determines that the boost condition is satisfied and causes the booster circuit to boost the voltage.

In some power systems applied to a vehicle having an electrical load that performs the function necessary for driving and the driving assistance function, it is possible to switch between driving in the first mode using the driving assistance function and driving in the second mode not using the driving assistance function. If the driving mode of the vehicle is the first mode, it is necessary to apply a high voltage in advance to the electrical load in order to perform a proper fail-safe process in the event of an anomaly in the first system. In this respect, if the driving mode of the vehicle is the first mode, the voltage of the storage battery can be properly adjusted as necessary by causing the booster circuit to boost the voltage.

In a sixteenth aspect, in the power system installed in a vehicle, the electrical load is a load that performs at least one function necessary for driving the vehicle and is a load that performs a driving assistance function of the vehicle, the vehicle is capable of driving in a first mode using the driving assistance function and driving in a second mode not using the driving assistance function, and the power system includes a mode control unit that, on a condition that voltage of the storage battery is higher than the power supply voltage of the first power source by a predetermined value or more, permits the driving mode of the vehicle to be switched from the second mode to the first mode.

In some power systems applied to a vehicle having an electrical load that performs the function necessary for driving and the driving assistance function, it is possible to switch between driving in the first mode using the driving assistance function and driving in the second mode not using the driving assistance function. In the foregoing configuration, on the condition that the voltage of the storage battery is higher than the power supply voltage of the first power source by a predetermined value or more, the driving mode of the vehicle is permitted to be switched from the second mode to the first mode, so that in the event of an anomaly in the first system after the switching to the first mode, it is possible to perform a proper fail-safe process thereafter.

First Embodiment

Hereinafter, an embodiment in which a power system according to the present disclosure is embodied as an in-vehicle power system 100 will be described with reference to the drawings. As illustrated in FIG. 1, the power system 100 is a system that supplies power to a general load 30 and a specific load 32. The power system 100 includes a high-voltage storage battery 10, a first DCDC converter (hereinafter, first converter) 12, a first storage battery 14, a second storage battery 16, a switch unit 20, a second DCDC converter (hereinafter, second converter) 26, and a control device 40.

The high-voltage storage battery 10 has a rated voltage (for example, several hundred volts) higher than those of the first storage battery 14 and the second storage battery 16, and is a lithium-ion storage battery, for example. The first converter 12 is a voltage generation unit that converts power supplied from the high-voltage storage battery 10 into power of a power supply voltage VA, and supplies the same to the general load 30 and the specific load 32. In the present embodiment, the power supply voltage VA is a voltage that enables driving of the general load 30 and the specific load 32.

The general load 30 is an electrical load (hereinafter, simply called load) that is not used for driving control of a vehicle as a moving body, and may include an air conditioner, an audio device, a power window, and the like, for example.

On the other hand, the specific load 32 is a load that performs at least one function used for driving control of the vehicle, and includes an electric power steering device 50 that controls steering of the vehicle, an electric brake device 51 that provides a braking force to the wheels, a driving control device 52 that monitors the surrounding situation of the vehicle, and the like, for example. In the present embodiment, the specific load 32 corresponds to an "electrical load", and the electric power steering device 50 corresponds to a "steering load".

If an anomaly occurs in these specific loads 32 to cause a loss of all their functions, it is not possible to perform driving control. Thus, the specific loads 32 include a first load 34 and a second load 36 that are redundant in function so that in the event of an anomaly, all the functions are not lost. Specifically, the electric power steering device 50 has a first steering motor 50A and a second steering motor 50B. The electric brake device 51 has a first brake device 51A and a second brake device 51B. The driving control device 52 has a camera 52A and a laser radar 52B. The first steering motor 50A, the first brake device 51A, and the camera 52A correspond to the first load 34. The second steering motor 50B, the second brake device 51B, and the laser radar 52B correspond to the second load 36.

The first load 34 and the second load 36 implement one function in combination, but also each of them can singly implement a part of the function. For example, the electric power steering device 50 enables free steering of the vehicle by the first steering motor 50A and the second steering motor 50B. With specific limitations on the steering speed and the steering range, the vehicle can be steered by each steering motor 50A and 50B.

The specific loads 32 implement a function of assisting control by a driver in manual driving. The specific loads 32 also implement a function necessary for autonomous driving in which behaviors of the vehicle such as driving and stopping are autonomously controlled. Thus, the specific loads 32 can be said to be loads that perform at least one function necessary for driving the vehicle.

The first load 34 is connected to the first converter 12 via a first in-line path LA1, and the first storage battery 14 and the general load 30 are connected to the first in-line path LA1. The first storage battery 14 is connected to the first in-line path LA via a predetermined connector terminal.

The first storage battery 14 is a lead storage battery, for example, and is chargeable by the power supply voltage VA of the first converter 12. In the present embodiment, the first converter 12, the first storage battery 14, the general load 30, and the first load 34 connected by the first in-line path LA1 constitute a first line ES1. In the present embodiment, the high-voltage storage battery 10 and the first converter 12 correspond to a "first power source", and the first storage battery 14 corresponds to a "first power source or first line storage battery".

The second load 36 is connected to the second storage battery 16 via a second in-line path LA2. The second storage battery 16 is a lithium-ion battery, for example. In the present embodiment, the second storage battery 16 and the second load 36 connected by the second in-line path LA2 constitute a second line ES2. In the present embodiment, the second storage battery 16 corresponds to a "second power source, storage battery, or second line storage battery".

The switch unit 20 is provided on a connection path LB that connects the lines. One end of the connection path LB is connected to the first in-line path LA1 at a connection point PA, and the other end of the connection path LB is connected to the second in-line path LA2 at a connection point PB. The switch unit 20 includes a first switching element (hereinafter, simply called first switch) SW1. In the present embodiment, an N-channel MOSFET (hereinafter, simply called MOSFET) is used as the first switch SW1. In the present embodiment, the first switch SW1 corresponds to an "in-line switch".

A current detection unit 28 is provided on the connection path LB. The current detection unit 28 is provided on a part of the connection path LB closer to the first line ES1 than the switch unit 20, and detects the magnitude and direction of an in-line current IA flowing in the part.

The second converter 26 is provided on the second in-line path LA2. More specifically, the second converter 26 is provided on the second in-line path LA2 between the connection point PB to the connection path LB and the second storage battery 16. The second converter 26 converts the power supplied from the first converter 12 into a higher voltage than the power supply voltage VA, and charges the second storage battery 16 at the high voltage. That is, the second storage battery 16 is a storage battery that is chargeable by the power supply voltage VA of the first converter 12. In the present embodiment, the second converter 26 corresponds to a "charging unit".

The control device 40 generates a first switching signal SC1 for operating the first switch SW1 based on the value of detection by the current detection unit 28, and outputs a command by the first switching signal SC1 to the first switch SW1. The control device 40 also generates first and second control signals SD1 and SD2 for controlling the operations of the first and second converters 12 and 26, and outputs commands by the first and second control signals SD1 and SD2 to the first and second converters 12 and 26. The first and second converters 12 and 26 are switched between the operational state and the non-operational state by the first and second control signals SD1 and SD2.

The control device 40 is connected to a notification unit 44, an IG switch 45, and an input unit 46 to control these components. The notification unit 44 is a device that provides a visual or auditory notification to the driver, and includes a display or a speaker installed in the vehicle interior, for example. The IG switch 45 is a vehicle start switch. The control device 40 monitors the opening or closing of the IG switch 45. The input unit 46 accepts the driver's operation, and includes a steering wheel, a lever, buttons, a pedal, and a sound input device, for example.

The control device 40 manually or autonomously drives the vehicle using the specific loads 32 described above. The control device 40 includes a known microcomputer including a CPU, a ROM, a RAM, a flash memory, and the like. The CPU refers to arithmetic programs and control data in the ROM to implement various functions for manual driving and autonomous driving.

Manual driving refers to a state in which the vehicle is controlled and driven by the driver's operations. Autonomous driving refers to a state in which the vehicle is controlled and driven by the control device 40 without intervention of the driver's operations. Specifically, the autonomous driving refers to autonomous driving at level 3 or higher among autonomous driving levels 0 to 5 that are prescribed by the National Highway Traffic and Safety Administration (NHTSA). The level 3 is a level at which the control device 40 controls both steering operation and acceleration/deceleration while observing the driving environment.

The control device 40 also uses the specific loads 32 described above to perform driving assistance functions such as lane keeping assist (LKA), lane change assist (LCA), and pre-crash safety (PCS). The control device 40 can switch the driving mode of the vehicle between a first mode using the driving assistance functions and a second mode not using the driving assistance functions, and the vehicle can drive in either of the driving modes. The control device 40 switches between the first mode and the second mode in response to a switching instruction from the driver via the input unit 46. The first mode includes a mode in which the vehicle is manually driven by the driver using the driving assistance functions and a mode in which the vehicle is autonomously driven. The second mode is a mode in which the driver manually drives the vehicle without using the driving assistance functions.

In the first mode, the control device 40 determines whether there has occurred an anomaly in the first line ES1 and the second line ES2. If the control device 40 determines that there has occurred no anomaly in any of the lines ES1 and ES2, the first load 34 and the second load 36 are used to perform the autonomous driving and driving assistance of the vehicle. Accordingly, the first and second loads 34 and 36 cooperate to perform one function necessary for the autonomous driving and driving assistance. In the present embodiment, the anomaly refers to an anomaly in power supply such as a ground fault or disconnection.

On the other hand, if the control device 40 determines that there has occurred an anomaly in any one of the lines ES1 and ES2, the control device 40 opens the first switch SW1 to electrically isolate the first line ES1 and the second line ES2. Accordingly, even in the event of an anomaly in any one of the lines ES1 and ES2, it is possible to drive the loads 34 and 36 in the other of the lines ES1 and ES2 without an anomaly.

If the first switch SW1 is opened due to the occurrence of an anomaly in the first line ES1, power is supplied from the second storage battery 16 to the second load 36 in the second line ES2. However, if the power system 100 is used in a low-temperature condition, there is concern that in the second line ES2, the second load 36 may not properly operate at the start of power supply from the second storage battery 16 due to a degradation in the performance of the second storage battery 16 or an increase in the wiring resistance on the second in-line path LA2.

In the present embodiment, the first path LC1 and the second path LC2 are provided in parallel to each other between the connection point PB to the connection path LB and the second storage battery 16 in the second line ES2. The second converter 26 is provided on the first path LC1 so that the second storage battery 16 is charged by the second converter 26 at a higher voltage than the power supply voltage VA with power supply from the first converter 12. In the present embodiment, the second converter 26 is a one-direction power conversion circuit that has only a booster circuit that boosts the power supply voltage VA to charge the second storage battery 16.

A switch unit 24 is provided on the second path LC2. In the following description, for making a distinction, the switch unit 20 will be called first switch unit 20, and the switch unit 24 will be called second switch unit 24. The second switch unit 24 includes a second switching element (hereinafter, simply called second switch) SW2 that opens or closes the second line ES2. In the present embodiment, an MOSFET is used as the second switch SW2. The control device 40 generates a second switching signal SC2 for operating the second switch SW2, and outputs a command by the second switching signal SC2 to the second switch SW2. In the present embodiment, the second switch unit 24 corresponds to a "discharge regulation unit", and the second switch SW2 corresponds to a "battery switch".

In the present embodiment, the second switch unit 24 performs a control process of regulating the discharge of the second storage battery 16 by the second path LC2. In this case, when power is supplied from the second storage battery 16 via the second line ES2 due to the occurrence of an anomaly in the first line ES1, the second storage battery 16 is charged at a higher voltage than the power supply voltage VA so that the second load 36 can be properly operated even under a low-temperature environment. In addition, the second switch unit 24 is provided in parallel to the second converter 26 so that unnecessary discharge of the second storage battery 16 is regulated even if the voltage of the second storage battery 16 is higher than the power supply voltage VA. Accordingly, it is possible to properly supply power to the loads 34 and 36 in the power system 100 having a plurality of power supply lines.

Figure 2:
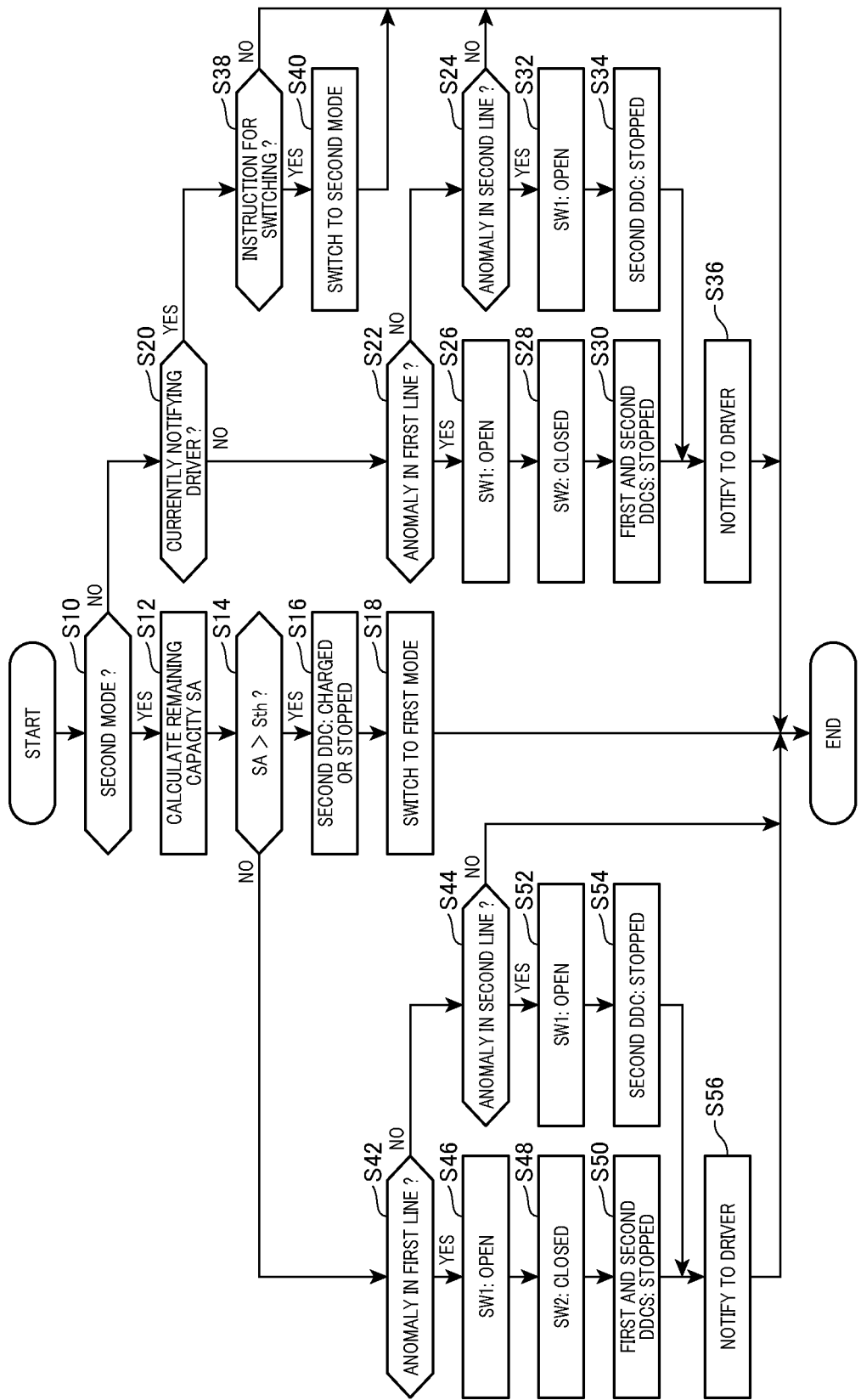
FIG. 2 is a flowchart of a procedure of a control process in the first embodiment.

FIG. 2 illustrates a flowchart of a control process in the present embodiment. When the IG switch 45 is closed, the control device 40 repeatedly performs the control process in predetermined control cycles. When the IG switch 45 is closed, the driving mode of the vehicle is initially set to the second mode. The first switch SW1 is closed, the second switch SW2 is opened, and the first and second converters 12 and 26 are in the operational state.

At the start of the control process, first, in step S10, the control device 40 determines whether the driving mode of the vehicle is the second mode. If the control device 40 makes an affirmative determination in step S10, the control device 40 calculates a remaining capacity SA of the second storage battery 16 in step S12. The remaining capacity SA is a state of charge (SOC) that indicates the charged state of the second storage battery 16, for example. If the second storage battery 16 is conductive (charged or discharged), the control device 40 calculates the remaining capacity SA using an integrated current value that is a time integrated value of charging/discharging current to/from the second storage battery 16.

In step S14, the control device 40 determines whether the remaining capacity SA calculated in step S12 is larger than a predetermined capacity threshold Sth. The capacity threshold Sth indicates a capacity with which the voltage of the second storage battery 16 is higher than the power supply voltage VA by a predetermined value or more. If the remaining capacity SA of the second storage battery 16 is smaller than the capacity threshold Sth, the voltage of the second storage battery 16 is not higher than the power supply voltage VA by a predetermined value or more and the prerequisite for the first mode is not satisfied. Thus, the control device 40 makes a negative determination in step S14, and proceeds to steps S42 and S44.

On the other hand, if the remaining capacity SA of the second storage battery 16 is higher than the capacity threshold Sth, the voltage of the second storage battery 16 is higher than the power supply voltage VA by a predetermined value or more and the prerequisite for the first mode is satisfied. Thus, the control device 40 makes an affirmative determination in step S14. In this case, in step S16, the control device 40 controls the second converter 26 as appropriate to switch between the operational state (charged state) and the non-operational state (uncharged state), in accordance with the remaining capacity SA of the second storage battery 16. Subsequently, the control device 40 permits switching of the driving mode of the vehicle from the second mode to the first mode in step S18, and ends the control process. The switching to the first mode takes place when a switching instruction such as an instruction for using the driving assistance functions or an instruction for autonomous driving is input by the driver via the input unit 46, for example. In the present embodiment, step S18 corresponds to a "mode control unit".

On the other hand, if the control device 40 makes a negative determination in step S10, the control device 40 determines in step S20 whether a driver notification is being provided. The driver notification here is intended to notify the driver of the occurrence of an anomaly in any one of the first line ES1 and the second line ES2 and prompt the driver to cease the first mode and switch to the second mode.

If the control device 40 makes a negative determination in step S20, the control device 40 determines in steps S22 and S24 that there has occurred an anomaly in any one of the first line ES1 and the second line ES2. Specifically, the control device 40 determines in step S22 whether there has occurred an anomaly in the first line ES1. If the control device 40 makes a negative determination in step S22, the control device 40 determines in step S24 whether there has occurred an anomaly in the second line ES2. In the present embodiment, step S22 corresponds to an "anomaly determination unit".

The occurrence of an anomaly can be determined by the magnitude and direction of the in-line current IA detected by the current detection unit 28. For example, if there has occurred a ground fault in the first line ES1, the direction of the in-line current IA detected by the current detection unit 28 is a direction from the second line ES2 to the first line ES1, and the magnitude of the in-line current IA detected by the current detection unit 28 is equal to or larger than a predetermined current threshold Ith for ground fault determination. Thus, the current flowing in the first line ES1 is equal to or larger than the current threshold Ith. Otherwise, if there has occurred a ground fault in the second line ES2, for example, the direction of the in-line current IA detected by the current detection unit 28 is a direction from the first line ES1 to the second line ES2, and the magnitude of the in-line current IA detected by the current detection unit 28 is equal to or larger than the current threshold Ith. Thus, the current flowing in the second line ES2 is equal to or larger than the current threshold Ith. Therefore, it is possible to determine in which of the lines ES1 and ES2 the anomaly has occurred by the magnitude and direction of the in-line current IA detected by the current detection unit 28.

If the control device 40 determines that there has occurred no anomaly in any of the lines ES1 and ES2, the control device 40 makes a negative determination in step S24. In this case, the control device 40 ends the control process. Accordingly, the first switch SW1 is maintained in the closed state, and the second switch SW2 is maintained in the open state and in the discharge regulated state. As a result, unnecessary discharge of the second storage battery 16 is regulated.

On the other hand, if the control device 40 determines that there has occurred an anomaly in any one of the lines ES1 and ES2, the control device 40 performs a process of ceasing power supply to the line with the anomaly and continuing the power supply to the electrical loads in the line without the anomaly.

Specifically, if the control device 40 makes an affirmative determination in step S22, first, the control device 40 opens the first switch SW1 in step S26. Subsequently, the control device 40 closes the second switch SW2 to eliminate the regulation of discharge on the second path LC2 in step S28. That is, if the control device 40 determines that there has occurred an anomaly in the first line ES1, the control device 40 first opens the first switch SW1 and then closes the second switch SW2. This secures the power supply from the second storage battery 16 to the second load 36 via the second path LC2. Subsequently, the control device 40 outputs a command for bringing the first and second converters 12 and 26 into the non-operational state in step S30. In the present embodiment, step S26 corresponds to a "state control unit".

If the control device 40 makes an affirmative determination in step S24, first, the control device 40 opens the first switch SW1 in step S32. As a result, the power supply from the first converter 12 to the first load 34 in the first line ES1 is continued. Subsequently, the control device 40 outputs a command for bringing the second converter 26 into the non-operational state in step S34.

After that, in step S36, the control device 40 makes a notification to prompt the driver to cease the first mode via the notification unit 44, and then ends the control process.

If the control device 40 makes an affirmative determination in step S20, the control device 40 determines in step S38 whether an instruction for switching to the second mode has been input by the driver via the input unit 46. That is, the control device 40 determines whether there is a response from the driver in accordance with the notification. If the control device 40 makes a negative determination in step S38, the control device 40 ends the control process, so that the driving of the vehicle in the first mode is continued using the loads 34 and 36 in the line without an anomaly.

On the other hand, if the control device 40 makes an affirmative determination in step S38, the control device 40 switches the driving mode of the vehicle from the first mode to the second mode in step S40, and then ends the control process.

In steps S42 and S44, that is, if the driving mode of the vehicle is the second mode, the control device 40 determines that there has occurred an anomaly in any one of the first line ES1 and the second line ES2. Specifically, the control device 40 determines in step S42 whether there has occurred an anomaly in the first line ES1. If the control device 40 makes a negative determination in step S42, the control device 40 determines in step S44 whether there has occurred an anomaly in the second line ES2.

If the control device 40 determines that there has occurred no anomaly in any of the lines ES1 and ES2, the control device 40 makes a negative determination in step S44. In this case, the control device 40 ends the control process so that the driving of the vehicle is continued in the second mode.

On the other hand, if the control device 40 determines that there has occurred an anomaly in any one of the lines ES1 and ES2, in subsequent steps S46 to S52, the control device 40 performs a process of ceasing power supply to the line with the anomaly and continuing power supply to the electrical loads in the line without the anomaly. Steps S46 to S52 are identical to steps S26 to S36 and thus description thereof will be omitted.

Figure 3:
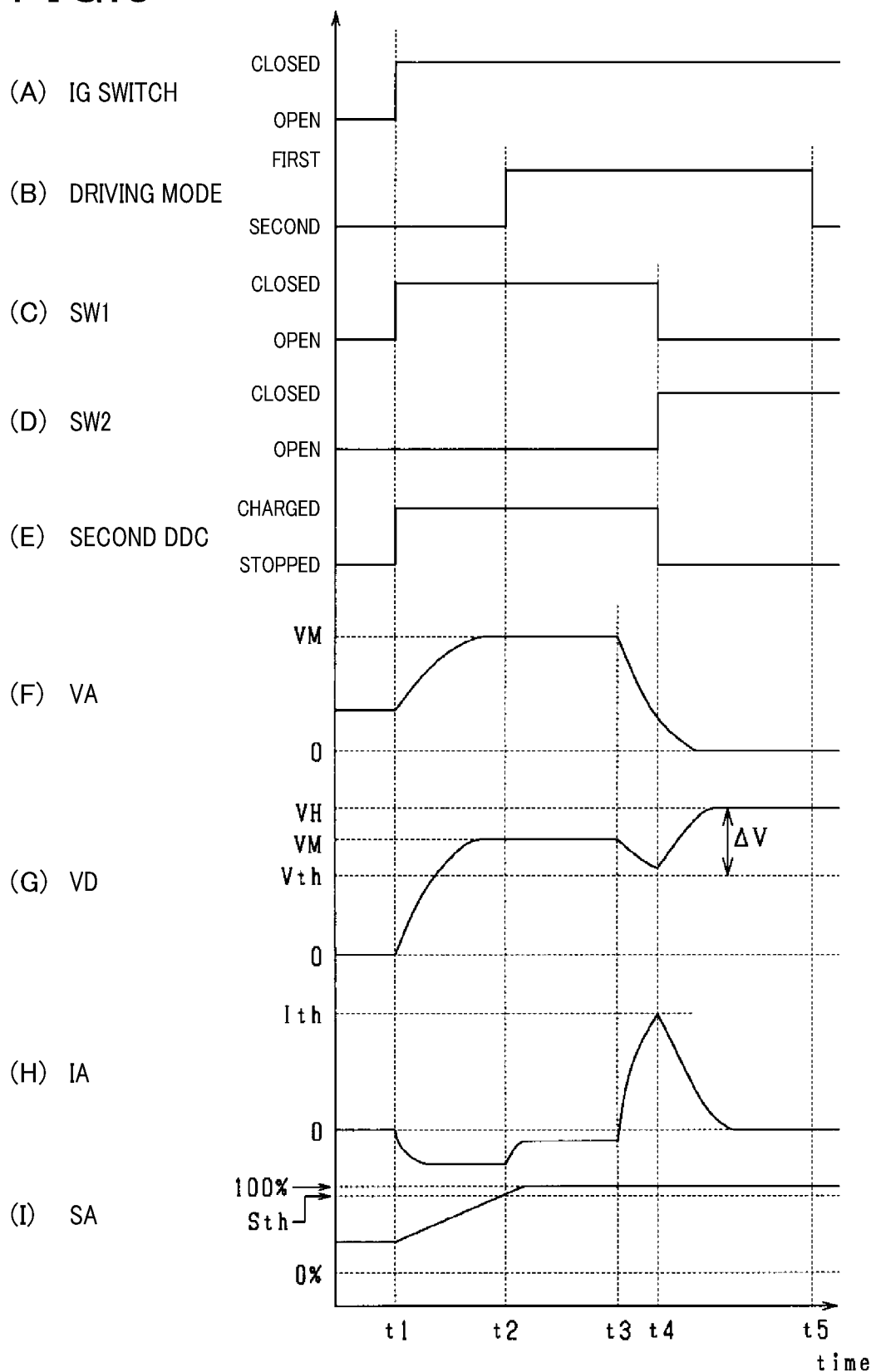
FIG. 3 is a time chart of an example of the control process in the first embodiment.

FIG. 3 illustrates an example of the control process. FIG. 3 illustrates transition of the power supply voltage VA and the load voltage VD applied to the second load 36 in the event of a ground fault anomaly (hereinafter, simply called ground fault) in the first line ES1 during driving of the vehicle in the first mode.

In FIG. 3, (A) indicates the transition of state of the IG switch 45, (B) indicates the transition of the driving mode of the vehicle, (C) indicates the transition of open/closed state of the first switch SW1, and (D) indicates the transition of open/close state of the second switch SW2. In addition, (E) indicates the transition of operational state of the second converter 26, (F) indicates the transition of the power supply voltage VA in the first converter 12, and (G) indicates the transition of the load voltage VD in the second load 36. Further, (H) indicates the transition of the in-line current IA, and (I) indicates the transition of the remaining capacity SA of the second storage battery 16. In FIG. 3, (H) indicates the transition of the in-line current IA flowing in a forward direction from the second line ES2 to the first line ES1.

As illustrated in FIG. 3, in the open period of the IG switch 45 until time t1, that is, in the suspend time of the power system 100, the first and second switches SW1 and SW2 are opened and the first and second converters 12 and 26 are switched to the non-operational state. Thus, the load voltage VD and the in-line current IA are zero in the open period of the IG switch 45.

When the IG switch 45 is closed at time t1, the first switch SW1 is closed and a command for switching the first and second converters 12 and 26 to the operational state is output. Accordingly, the first converter 12 is switched to the operational state, and the power supply voltage VA and the load voltage VD rise to a predetermined operating voltage VM, so that the driving of the vehicle in the second mode is enabled. The operating voltage VM is a voltage within a range of driving voltages of the first and second loads 34 and 36.

In addition, the second converter 26 is switched to the operational state, and the second storage battery 16 is charged by the power supply voltage VA of the first converter 12. Accordingly, the voltage of the second storage battery 16 rises to a predetermined boost voltage VH (see (G) in FIG. 3) higher than the power supply voltage VA.

When the remaining capacity SA of the second storage battery 16 rises and becomes larger than the capacity threshold Sth, the switching of the driving mode of the vehicle from the second mode to the first mode is enabled at time t2. In the present embodiment, even after the switching to the first mode, the second converter 26 is maintained in the operational state and the charging of the second storage battery 16 is continued. In the first mode, along with the rise of the remaining capacity SA, the charging current of the second storage battery 16 decreases and the magnitude of the in-line current IA decreases. Then, when the remaining capacity SA becomes full, the charging of the second storage battery 16 is temporarily stopped.

During the driving of the vehicle in the first mode, it is determined that a ground fault has occurred in any one of the first line ES1 and the second line ES2. If it is determined that no ground fault has occurred in any of the lines ES1 and ES2, the first switch SW1 is maintained in the closed state. Accordingly, power supply from the first converter 12 and the first storage battery 14 to the first and second loads 34 and 36 is enabled. The power supply from the first converter 12 enables continuous power supply even at long-time autonomous driving, and the power supply from the first storage battery 14 enables power supply with less voltage fluctuation. As a result, in the period from time t2 to time t3, the autonomous driving and the driving assistance are performed using the first load 34 and the second load 36.

If it is determined that a ground fault has occurred in any one of the lines ES1 and ES2, the first switch SW1 is closed. In the example of FIG. 3, a ground fault occurs in the first line ES1 at time t3. Accordingly, the power supply voltage VA and the load voltage VD decrease. Due to the inductance component of the connection path LB, the decrease rate of the load voltage VD is lower than the decrease rate of the power supply voltage VA.

In addition, the in-line current IA increases, and then at time t4, the in-line current IA becomes equal to or larger than a current threshold Ith. Thus, it is determined that a ground fault has occurred in the first line ES1. In this case, at time t4, the first switch SW1 is opened and the first converter 12 is switched to the non-operational state. Accordingly, the in-line current IA decreases.

At time t4, the second converter 26 is switched to the non-operational state, and the second switch SW2 is closed. Accordingly, the load voltage VD rises due to power supply from the second storage battery 16 to the second load 36 via the second path LC2. In the present embodiment, in the event of an anomaly in the first line ES1, since the voltage of the second storage battery 16 rises to the boost voltage VH higher than the operating voltage VM of the power supply voltage VA, the load voltage VD rises to the boost voltage VH. Thus, it is possible to secure a predetermined voltage difference AV between the voltage of the second storage battery 16 and the threshold voltage Vth that is the lower limit of the driving voltage of the first and second loads 34 and 36. Accordingly, it is possible to properly operate the second load 36 even under a low-temperature environment.

After that, when an instruction for switching to the second mode is input by the driver via the input unit 46, the driving mode of the vehicle is switched from the first mode to the second mode at time t5.

According to the present embodiment described above in detail, it is possible to obtain the following advantageous effects.

In the present embodiment, the first path LC1 and the second path LC2 are provided in parallel to each other between the connection point PB to the connection path LB and the second storage battery 16 in the second line ES2. On the first path LC1, the second storage battery 16 is charged by the second converter 26 at a higher voltage than the power supply voltage VA of the first converter 12 due to power supply from the first converter 12. On the second path LC2, the discharge of the second storage battery 16 in the second line ES2 is regulated by the second switch unit 24.

In this case, when power is supplied from the second storage battery 16 in the second line ES2 due to the occurrence of an anomaly in the first line ES1, the second storage battery 16 is charged at a higher voltage than the power supply voltage VA so that the second load 36 can be properly operated even under a low-temperature environment. In addition, since the second switch unit 24 is provided in parallel to the second converter 26, unnecessary discharge of the second storage battery 16 is regulated even if the second storage battery 16 is at a higher voltage than the power supply voltage VA. Accordingly, it is possible to properly supply power to the loads 34 and 36 in the power system 100 having a plurality of power lines.

In the present embodiment, the second switch unit 24 is provided with the second switch 5 SW2 such that the first switch SW1 and the second switch SW2 are opened or closed in cooperation based on the presence or absence of an anomaly in the first line ES1. Accordingly, it is possible to properly manage the discharge of the second storage battery 16 both during normal operation of the first line ES1 and in the event of an anomaly in the first line ES1.

If it is determined that there has occurred an anomaly in the first line ES1, the first switch SW1 is opened and the second switch SW2 is closed so that power is supplied from the second storage battery 16 to the second load 36 in the second line ES2. However, if the second switch SW2 is closed before the first switch SW1 is opened, there is concern that power is wastefully supplied from the second storage battery 16 to the first line ES1 with the anomaly. In this respect, in the present embodiment, in the event of an anomaly in the first line ES1, the first switch SW1 is first opened and then the second switch SW2 is closed. Accordingly, it is possible to suppress power supply from the second storage battery 16 to the first line ES and properly supply power to the second load 36.

The first load 34 and the second load 36 are loads that perform the functions necessary for driving the vehicle and the driving assistance functions. The driving of the vehicle can be switched between driving in the first mode using the driving assistance functions and driving in the second mode not using the driving assistance functions. In the present embodiment, the switching of the driving mode of the vehicle from the second mode to the first mode is permitted on the condition that the remaining capacity SA of the second storage battery 16 is larger than the capacity threshold Sth that indicates the capacity with which the voltage of the second storage battery 16 is higher than the power supply voltage VA by a predetermined value or more. Accordingly, even if an anomaly has occurred in the first line ES1 after the shift to the first mode, it is possible to properly perform a fail-safe process thereafter.

Second Embodiment

Hereinafter, a second embodiment will be described, centering on differences from the first embodiment, with reference to FIGS. 4 and 5.

The present embodiment is different from the first embodiment in that, in a first mode, if it is determined that there has occurred an anomaly in a first line ES1, a second switch SW2 is first closed and then a first switch SW1 is opened. A control device 40 has a second current threshold Ith2 that is set to a value smaller than a first current threshold Ith1 that is a current threshold Ith for ground fault determination. In a control process, the control device 40 closes the second switch SW2 using the second current threshold Ith2, and opens the first switch SW1 using the second current threshold Ith2. In the present embodiment, the first current threshold Ith1 corresponds to a "first threshold", and the second current threshold Ith2 corresponds to a "second threshold".

Figure 4:
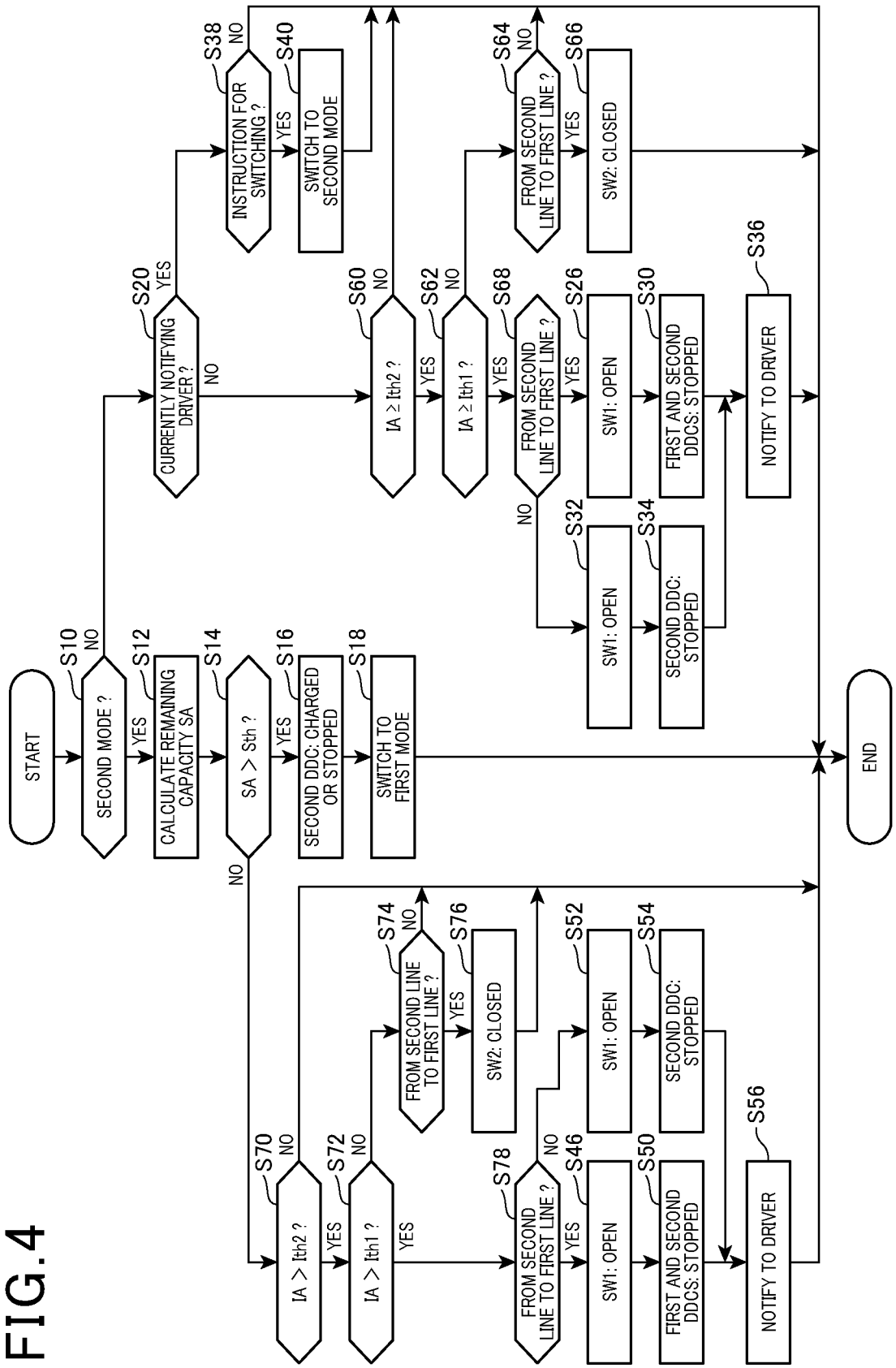
FIG. 4 is a flowchart of a procedure of a control process in a second embodiment.

FIG. 4 is a flowchart of the control process in the present embodiment. Steps described in FIG. 4 identical to the steps described in FIG. 2 are given identical step numbers for the sake of convenience, and description thereof will be omitted.

In the control process of the present embodiment, if the control device 40 makes a negative determination in step S20, the control device 40 determines in step S60 whether the magnitude of an in-line current IA detected by a current detection unit 28 is equal to or larger than the second current threshold Ith2. If the control device 40 makes a negative determination in step S60, the control device 40 ends the control process. On the other hand, If the control device 40 makes an affirmative determination in step S60, the control device 40 determines in step S62 whether the magnitude of the in-line current IA is equal to or larger than the first current threshold Ith1.

If the magnitude of the in-line current IA is equal to or larger than the second current threshold Ith2 and is smaller than the first current threshold Ith1, the control device 40 makes a negative determination in step S62. In this case, the control device 40 determines in step S64 whether the direction of the in-line current IA detected by the current detection unit 28 is a direction from a second line ES2 to the first line ES1.

If the direction of the in-line current IA detected by the current detection unit 28 is the direction from the first line ES1 to the second line ES2, the control device 40 makes a negative determination in step S64 and ends the control process.

On the other hand, if the direction of the in-line current IA detected by the current detection unit 28 is the direction from the second line ES2 to the first line ES1, the current flowing in the first line ES1 becomes equal to or larger than the second current threshold Ith2 smaller than the first current threshold Ith1. In this case, the control device 40 makes an affirmative determination in step S64. The control device 40 closes the second switch SW2 in step S66, and ends the control process.

On the other hand, if the magnitude of the in-line current IA is equal to or larger than the first current threshold Ith1, the control device 40 makes an affirmative determination in step S62. In this case, the control device 40 determines in step S68 whether the direction of the in-line current IA detected by the current detection unit 28 is the direction from the second line ES2 to the first line ES1.

If the direction of the in-line current IA detected by the current detection unit 28 is the direction from the first line ES1 to the second line ES2, the current flowing in the first line ES1 becomes equal to or larger than the first current threshold Ith1. In this case, the control device 40 determines that there has occurred an anomaly in the first line ES1. The control device 40 makes an affirmative determination in step S68, and the process moves to step S26.

On the other hand, if the direction of the in-line current IA detected by the current detection unit 28 is the direction from the second line ES2 to the first line ES1, the current flowing in the second line ES2 becomes equal to or larger than the first current threshold Ith1. In this case, the control device 40 determines that there has occurred an anomaly in the second line ES2. The control device 40 makes a negative determination in step S68, and moves to step S32.

On the other hand, If the control device 40 makes an affirmative determination in step S14, the control device 40 performs steps S70 to S78. Steps S70 to S78 are identical to step S60 to S68 and thus description thereof will be omitted.

Figure 5:
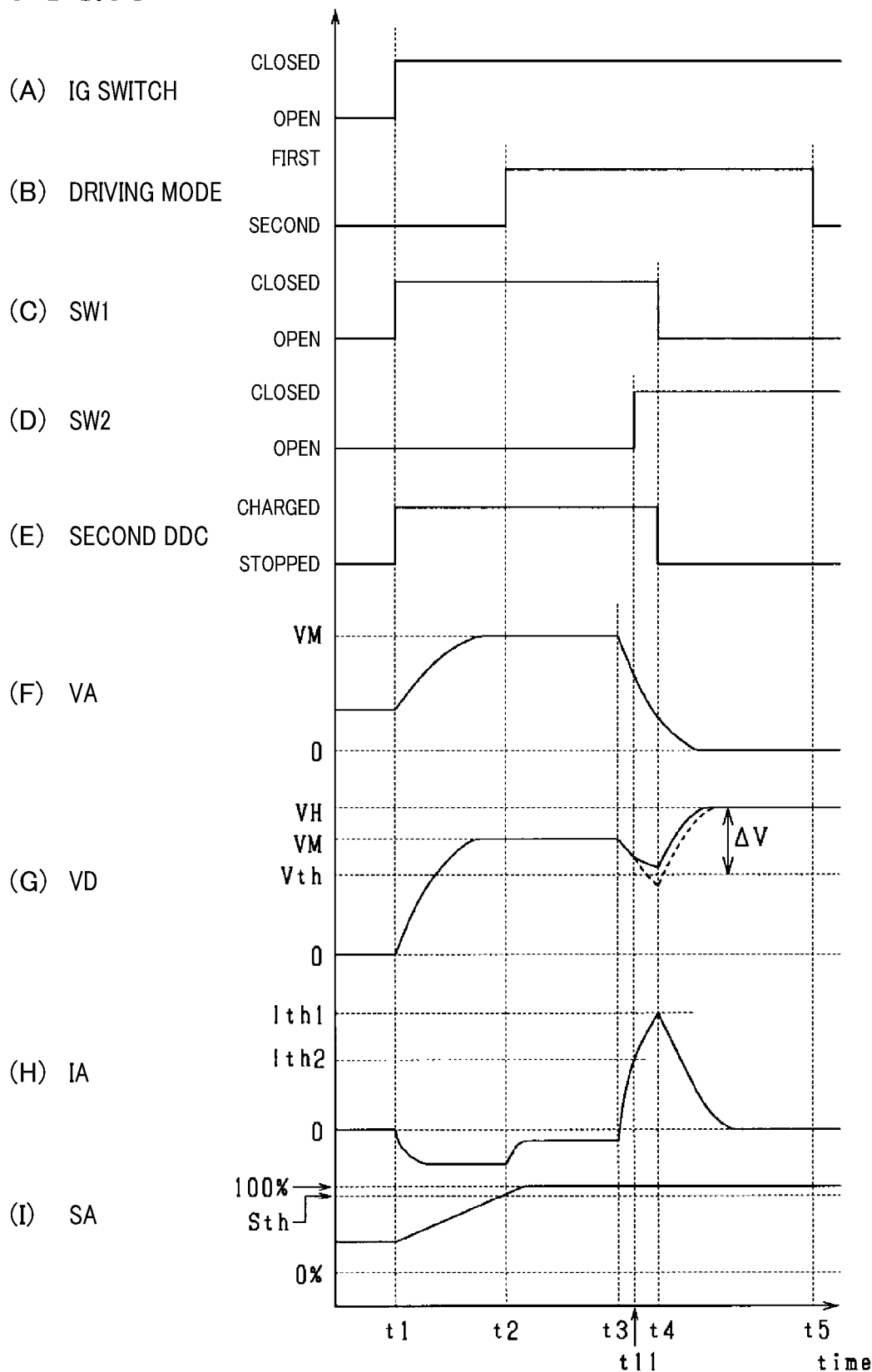
FIG. 5 is a time chart of an example of the control process in the second embodiment.

FIG. 5 illustrates transition of a power supply voltage VA and a load voltage VD applied to a second load 36 in the event of a ground fault in the first line ES1 during driving of the vehicle in a first mode. In FIG. 5, (A) to (I) are identical to (A) to (I) in FIG. 3, and thus description thereof will be omitted. In FIG. 5, the steps until time t3 are identical to the steps described in FIG. 3, and thus description thereof will be omitted.

As illustrated in FIG. 5, if a ground fault has occurred in the first line ES1 at time t3, the load voltage VD decreases and the in-line current IA increases. Thereafter, at time t11, the in-line current IA becomes equal to or larger than the second current threshold Ith2. In this case, the second switch SW2 is closed at time t11. That is, the second switch SW2 is closed before the first switch SW1 is opened, and power supply from a second storage battery 16 to the second load 36 via a second path LC2 is started. Accordingly, as illustrated by the broken line in (G) of FIG. 5, like in the case where the first switch SW1 is first opened and the second switch SW2 is closed, the power supply to the second load 36 is temporarily shut off to suppress the load voltage VD from becoming lower than a threshold voltage Vth.

Thereafter, at time t4, when the in-line current IA becomes equal to or larger than the first current threshold Ith1, it is determined that a ground fault has occurred in the first line ES1. In this case, at time t4, the first switch SW1 is opened and the first and second converters 12 and 26 are switched to the non-operational state.

According to the present embodiment described above in detail, the foregoing advantageous effects can be obtained.

If it is determined that an anomaly has occurred in the first line ES1, the first switch SW1 is opened and the second switch SW2 is closed so that power is supplied from the second storage battery 16 to the second load 36 in the second line ES2. However, if the first switch SW1 is opened before the second switch SW2 is closed, there is concern that the power supply to the second load 36 may be temporarily shut off. In this respect, in the present embodiment, in the event of an anomaly in the first line ES1, the second switch SW2 is first closed and then the first switch SW1 is opened. Accordingly, it is possible to suppress shutoff of the power supply to the second load 36, thereby properly supplying power to the second load 36.

Specifically, the first switch SW1 is opened if the in-line current IA equal to or larger than the first current threshold Ith1 flows in the direction from the first line ES1 to the second line ES2 and the current flowing in the first line ES1 becomes equal to or larger than the first current threshold Ith1. In addition, the second switch SW2 is closed if the in-line current IA equal to or larger than the second current threshold Ith2 flows in the direction from the first line ES1 to the second line ES2 and the current flowing in the first line ES1 becomes equal to or larger than the second current threshold Ith2 smaller than the first current threshold Ith1. Accordingly, it is possible to appropriately open or close the first switch SW1 and the second switch SW2 in cooperation.

Third Embodiment

Hereinafter, a third embodiment will be described, centering on differences from the first embodiment, with reference to FIGS. 6 and 7.

Figure 6:
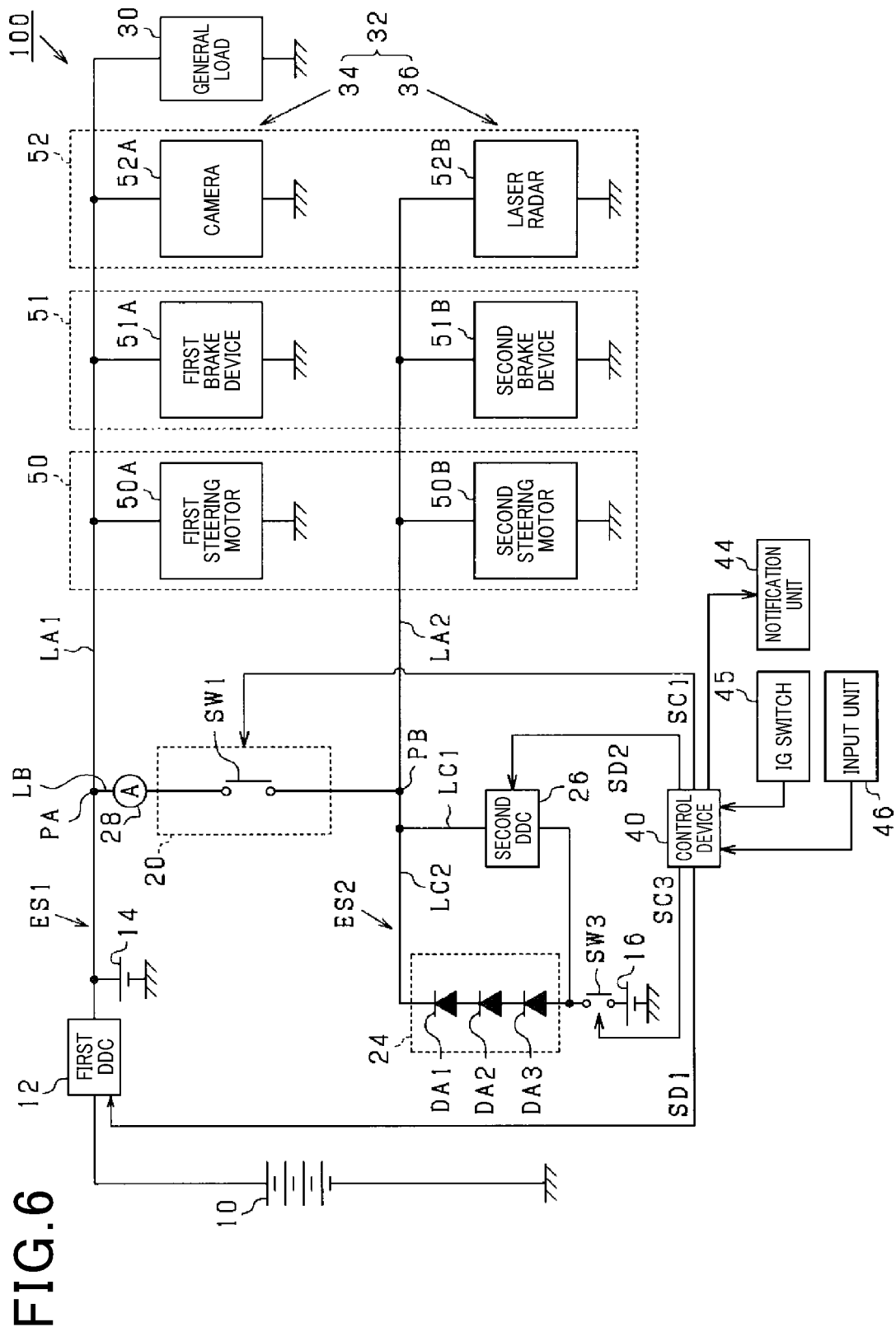
FIG. 6 is a general configuration diagram of a power system in a third embodiment.

The present embodiment is different from the first embodiment in that a second switch unit 24 includes first to third diodes DA1 to DA3 connected in series to one another as illustrated in FIG. 6. The diodes DA1 to DA3 are arranged such that the cathodes are located on the side of a connection point PB to a connection path LB and the anodes are located on the side of a second storage battery 16, thereby to regulate the flow of current from the connection point PB to the second storage battery 16 on a second path LC2.

The diodes DA1 to DA3 have a predetermined forward voltage drop amount (for example, 0.7 V). This generates a voltage difference between the voltage of the second storage battery 16 applied to the second storage battery 16 side of the second switch unit 24 and a power supply voltage VA of a first converter 12 applied to the connection point PB side of the second switch unit 24, due to the total value of forward voltage drop amounts of the first to third diodes DA1 to DA3 (hereinafter, called voltage difference generated by the first to third diodes DA1 to DA3).

In the present embodiment, the voltage difference generated by the first to third diodes DA1 to DA3 is set to be larger than the voltage difference between the voltage of the second storage battery 16 and the power supply voltage VA during normal operation of a first line ES1.

Specifically, the voltage difference generated by the first to third diodes DA1 to DA3 is set to be larger than the voltage difference between a boost voltage VH of the second storage battery 16 and an operating voltage VM that is the power supply voltage VA. Thus, during normal operation of the first line ES1, the flow of current from the connection point PB to the second storage battery 16 and the flow of current from the second storage battery 16 to the connection point PB are regulated on the second path LC2. In the present embodiment, an in-series connected body of the first to third diodes DA1 to DA3 corresponds to a "rectifier element".

In the present embodiment, a third switching element (hereinafter, simply called third switch) SW3 is provided between the connection point between the first and second paths LC1 and LC2 on the second storage battery 16 side and the second storage battery 16. In the present embodiment, an MOSFET is used as the third switch SW3. In a control process, a control device 40 generates a third switching signal SC3 for operating the third switch SW3, and outputs a command by the SC3 to the third switch SW3.

Figure 7:
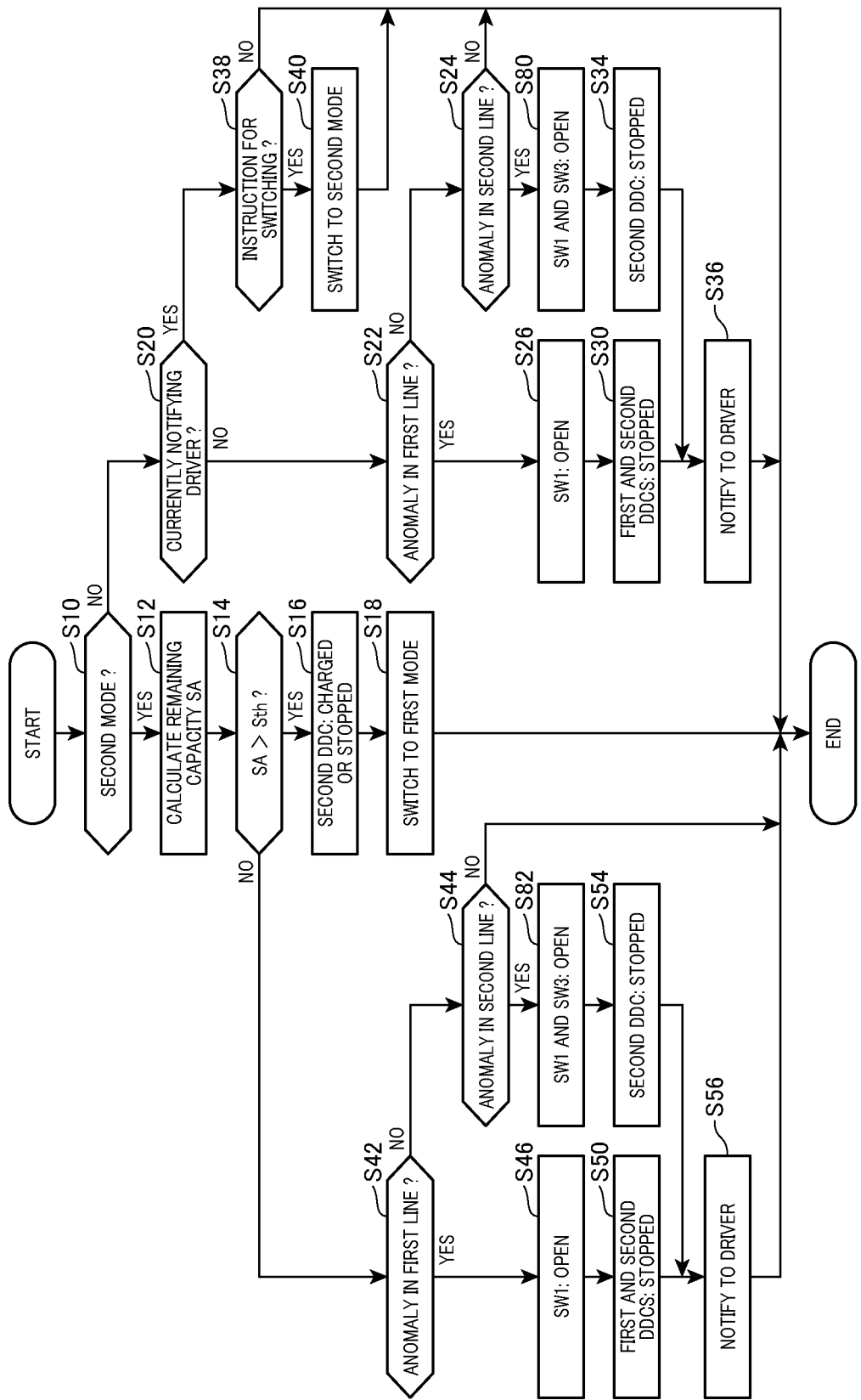
FIG. 7 is a flowchart of a procedure of a control process in the third embodiment.

FIG. 7 is a flowchart of the control process in the present embodiment. Steps described in FIG. 7 identical to the steps described in FIG. 2 are given identical step numbers for the sake of convenience, and description thereof will be omitted. At the closing of an IG switch 45, the third switch SW3 is initially closed.

In the control process of the present embodiment, If the control device 40 makes an affirmative determination in step S22, the control device 40 opens a first switch SW1 in step S26 and moves to step S30. Thus, in the present embodiment, in the event of an anomaly in the first line ES1, the second storage battery 16 is discharged due to decrease in the load voltage VD of a second line ES2. If the control device 40 makes an affirmative determination in step S24, the control device 40 opens the first and third switches SW1 and SW3 in step S80, and moves to step S34.

On the other hand, If the control device 40 makes an affirmative determination in step S42, the control device 40 performs step S46. If the control device 40 makes an affirmative determination in step S44, the control device 40 performs step S82. Steps S46 and S82 are identical to steps S26 and S80, and thus description thereof will be omitted.

According to the present embodiment described above in detail, the first to third diodes DA1 to DA3 are provided as the second switch unit 24. The first to third diodes DA1 to DA3 are used to regulate the flow of current from the connection point PB to the connection path LB to the second storage battery 16 and generate a predetermined voltage difference between the voltage of the second storage battery 16 and the power supply voltage VA on the second path LC2. Accordingly, the discharge of the second storage battery 16 is regulated while the second storage battery 16 is maintained at a higher voltage than the power supply voltage VA of the first converter 12. In the event of an anomaly in the first line ES1, the second storage battery 16 is discharged due to decrease in the load voltage VD in the second line ES2, thereby allowing early power supply to the second load 36.

Fourth Embodiment

Hereinafter, a fourth embodiment will be described, centering on differences from the third embodiment, with reference to FIGS. 8 and 9.

Figure 8:
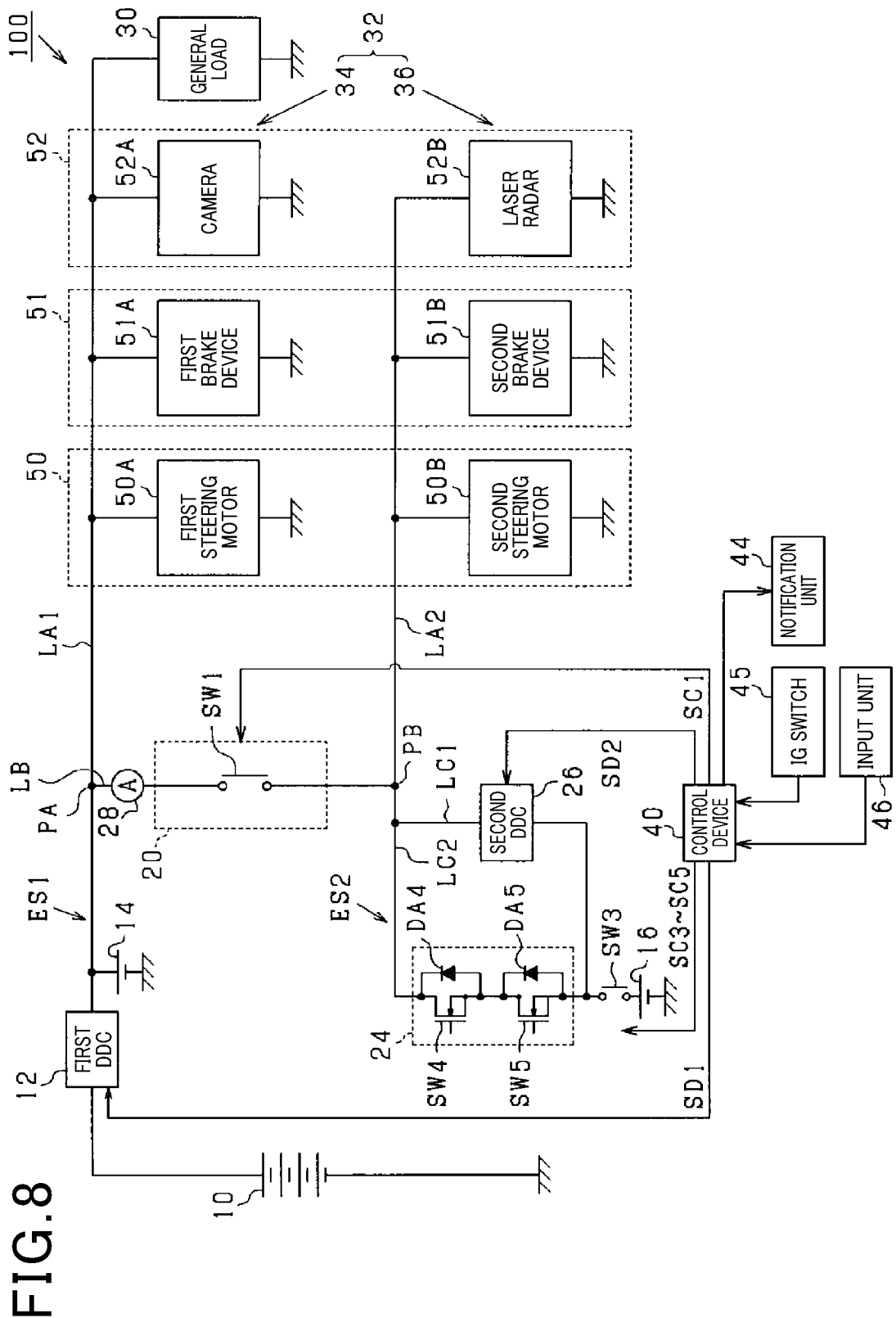
FIG. 8 is a general configuration diagram of a power system in a fourth embodiment.

The present embodiment is different from the third embodiment in that a second switch unit 24 includes fourth and fifth switching elements (hereinafter, simply called fourth and fifth switches) SW4 and SW5 that are semiconductor switching elements having parasitic diodes as illustrated in FIG. 8. In the present embodiment, MOSFETs are used as the fourth and fifth switches SW4 and SW5. In a control process, a control device 40 generates fourth and fifth switching signals SC4 and SC5 for operating the fourth and fifth switches SW4 and SW5, and outputs commands by the fourth and fifth switching signals SC4 and SC5 to the fourth and fifth switches SW4 and SW5.

A fourth diode DA4 is connected as a parasitic diode in parallel to the fourth switch SW4, and a fifth diode DA5 is connected as a parasitic diode in parallel to the fifth switch SW5. In the present embodiment, the fourth and fifth switches SW4 and SW5 are connected in series such that the fourth and fifth diodes DA4 and DA5 are equal in orientation. More specifically, the diodes DA4 and DA5 are arranged such that the cathodes are located on a connection path LB side and the anodes are located on a second storage battery 16 side.

The fourth and fifth diodes DA4 and DA5 regulate the flow of current from a connection point PB to the second storage battery 16 on a second path LC2. That is, in the present embodiment, 5 the parasitic diodes constitute a rectifier element that regulates the flow of current from the connection point PB to the second storage battery 16 on the second path LC2. In the present embodiment, the voltage difference generated by the fourth and fifth diodes DA4 and DA5 is set to be larger than the voltage difference between the voltage of the second storage battery 16 and a power supply voltage VA during normal operation of a first line ES1.

A parasitic diode generates a larger amount of heat due to power distribution than a single diode element. Thus, in the event of an anomaly in the first line ES1, there is concern that the temperatures of the fourth and fifth switches SW4 and SW5 may excessively rise due to power distribution to the fourth and fifth diodes DA4 and DA5. In the present embodiment, in a control process, in the event of an anomaly in the first line ES1, the fourth and fifth switches SW4 and SW5 are closed to bring the fourth and fifth switches SW4 and SW5 into a conductive state.

Figure 9:
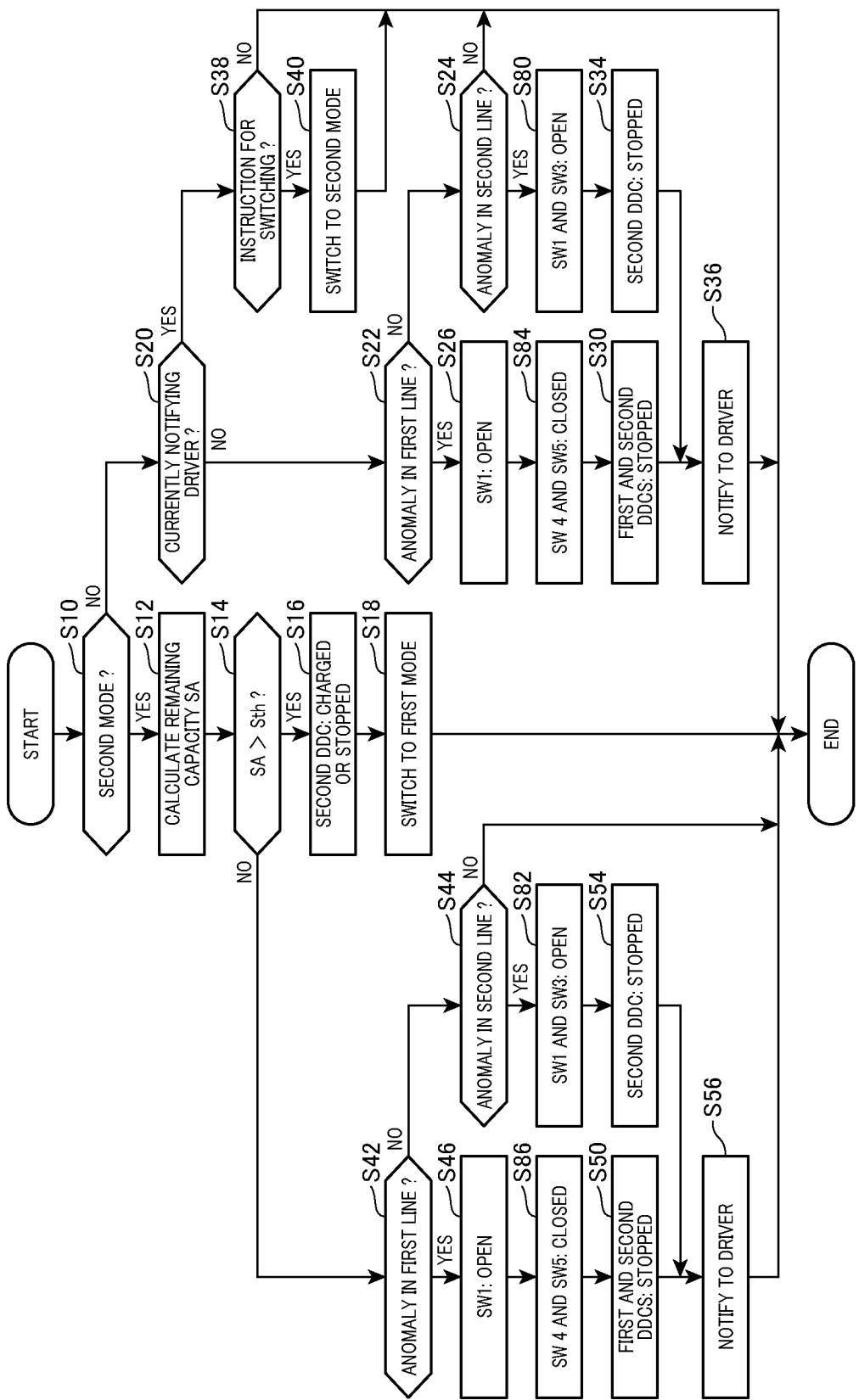
FIG. 9 is a flowchart of a procedure of a control process in the fourth embodiment.

FIG. 9 is a flowchart of the control process in the present embodiment. Steps described in FIG. 9 identical to the steps described in FIGS. 2 and 7 are given identical step numbers for the sake of convenience, and description thereof will be omitted. At the closing of an IG switch 45, the fourth and fifth switches SW4 and SW5 are initially closed.

In the control process of the present embodiment, if the control device 40 makes an affirmative determination in step S22, the control device 40 opens the first switch SW1 in step S26. Subsequently, in step S84, the control device 40 closes the fourth and fifth switches SW4 and SW5, and moves to step S30. Thus, immediately after the occurrence of an anomaly in the first line ES1, current flows via the fourth and fifth didoes DA4 and DA5. After that, when the fourth and fifth switches SW4 and SW5 are closed, current flows via the fourth and fifth switches SW4 and SW5.

On the other hand, if the control device 40 opens the first switch SW1 in step S46, the control device 40 performs step S86. Step S86 is identical to step S84, and thus description thereof will be omitted.

In the present embodiment described above in detail, the parasitic diodes of the fourth and fifth switches SW4 and SW5 are used as rectifier element. Thus, in the event of an anomaly in the first line ES1, power can be supplied from the second storage battery 16 to the second load 36 via the fourth and fifth diodes DA4 and DA5 that are parasitic diodes. However, there is concern that the fourth and fifth diodes DA4 and DA5 may generate heat due to power distribution. In this respect, in the present embodiment, in the event of an anomaly in the first line ES1, the fourth and fifth switches SW4 and SW5 are closed. Accordingly, it is possible to suppress heat generation of the fourth and fifth diodes DA4 and DA5 while enabling early power supply to the second load 36.

Fifth Embodiment

Figure 10:
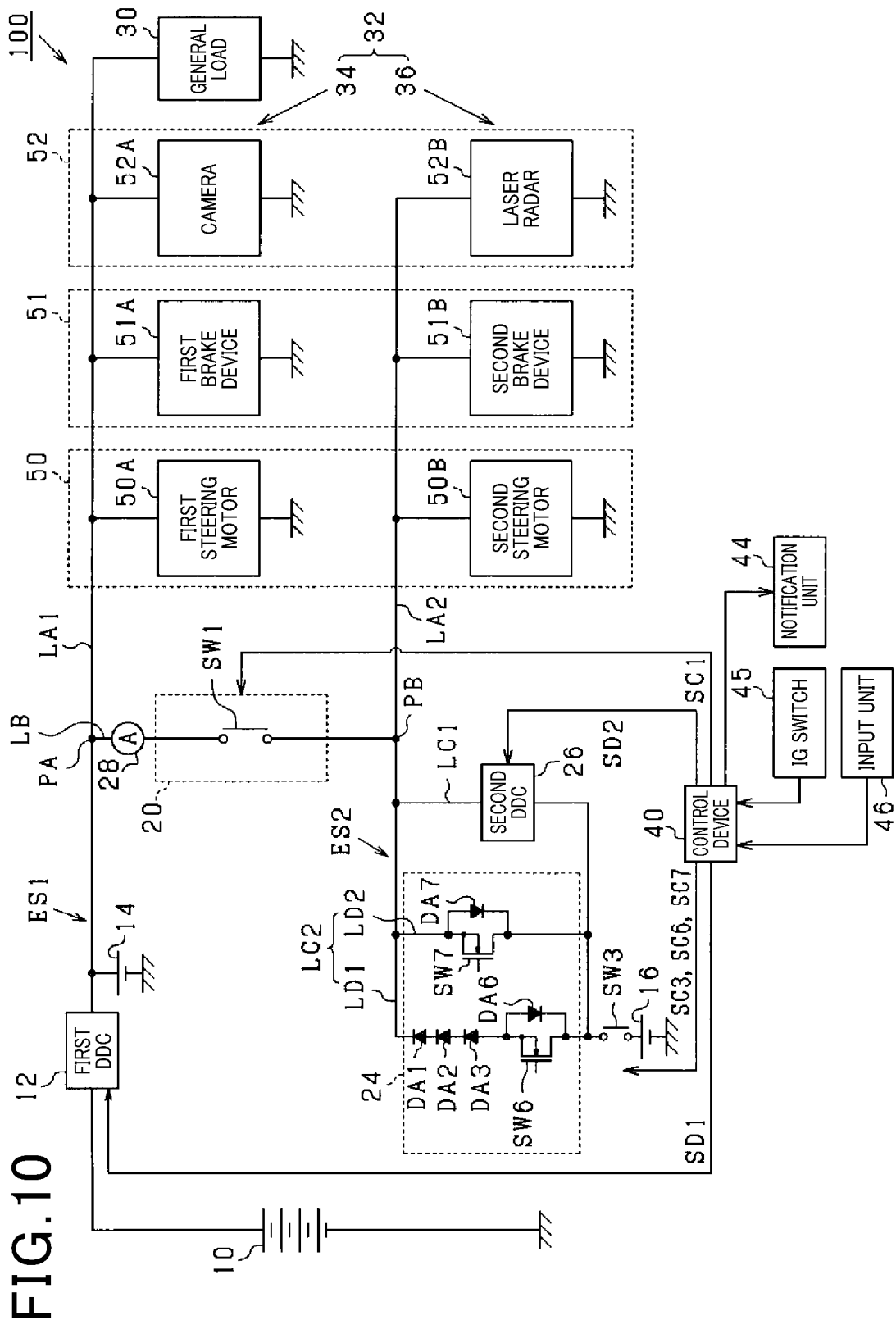
FIG. 10 is a general configuration diagram of a power system in a fifth embodiment.

Hereinafter, a fifth embodiment will be described, centering on differences from the third embodiment, with reference to FIGS. 10 and 11.

The present embodiment is different from the third embodiment in that a second path LC2 is formed by a first regulation path LD1 and a second regulation path LD2 that are provided in parallel to each other. That is, in the present embodiment, a first path LC1, the first regulation path LD1, and the second regulation path LD2 are provided in parallel to one another between a connection point PB to a connection path LB and a second storage battery 16 in a second line ES2.

The first regulation path LD1 is provided with first to third diodes DA1 to DA3 connected in series and a sixth switching element (hereinafter, simply called sixth switch) SW6. On the first regulation path LD1, the first to third diodes DA1 to DA3 are provided closer to the connection path LB than the sixth switch SW6. On the second regulation path LD2, a seventh switching element (hereinafter, simply called seventh switch) SW7 is provided. The first to third diodes DA1 to DA3 and the sixth and seventh switches SW6 and SW7 constitute a second switch unit 24. In the present embodiment, the sixth switch SW6 corresponds to a "second regulation switch", and the seventh switch SW7 corresponds to a "regulation switch or first regulation switch".

The six switch SW6 opens or closes the first regulation path LD1, and the seventh switch SW7 opens or closes the second regulation path LD2. In the present embodiment, MOSFETs are used as the sixth and seventh switches SW6 and SW7. In a control process, a control device 40 generates sixth and seventh switching signals SC6 and SC7 for operating the sixth and seventh switches SW6 and SW7, and outputs commands by the sixth and seventh switching signals SC6 and SC7 to the sixth and seventh switches SW6 and SW7.

A sixth diode DA6 is connected as a parasitic diode in parallel to the sixth switch SW6, and a seventh diode DA7 is connected as a parasitic diode in parallel to the seventh switch SW7. In the present embodiment, the diodes DA6 and DA7 are arranged on the regulation paths LD1 and LD2 such that the cathodes are located on the secondary storage battery 16 side and the anodes are located on the connection path LB side. Thus, the first to third diodes DA1 to DA3 and the sixth diode DA6 are oriented in opposite directions on the first regulation path LD1. The seventh diode DA7 is provided on the second regulation path LD2 so as to regulate the flow of current from the secondary storage battery 16 to the connection point PB and permit the flow of current from the connection point PB to the secondary storage battery 16. In the present embodiment, the seventh diode DA7 corresponds to a "charging permission unit".

If it is determined that no anomaly has occurred in any of lines ES1 and ES2, the secondary storage battery 16 is charged as appropriate by a power supply voltage VA of a first converter 12. For example, if the voltage of the secondary storage battery 16 temporarily rises at the start of charging of the secondary storage battery 16, there is concern that the second storage battery 16 being charged via the first to third diodes DA1 to DA3 may be discharged.

If it is determined that an anomaly has occurred in the first line ES1, power is supplied from the second storage battery 16 to a second load 36 via the first to third diodes DA1 to DA3. Since the diodes DA1 to DA3 have forward voltage drop amounts, if power is supplied to the second load 36 via the first to third diodes DA1 to DA3, a load voltage VD decreases due to the forward voltage drop amounts of the diodes DA1 to DA3. In addition, there is concern that power consumption of the second storage battery 16 may increase due to the forward voltage drop amounts. Thus, in the present embodiment, the opening and closing of the sixth and seventh switches SW6 and SW7 are switched as appropriate in the control process.

Figure 11:
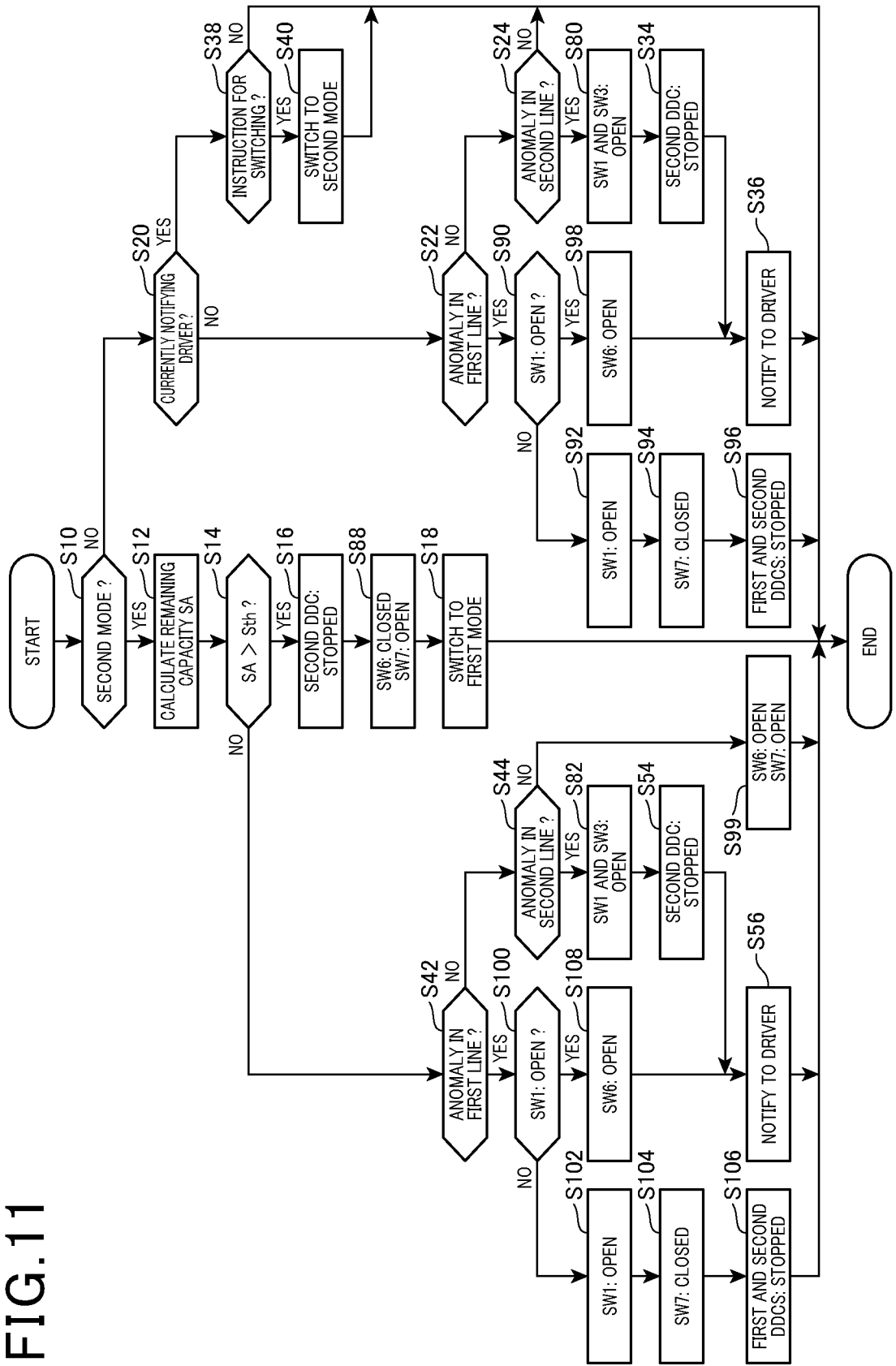
FIG. 11 is a flowchart of a procedure of a control process in the fifth embodiment.

FIG. 11 is a flowchart of the control process in the present embodiment. Steps described in FIG. 11 identical to the steps described in FIGS. 2 and 7 are given identical step numbers for the sake of convenience, and description thereof will be omitted.

In the control process of the present embodiment, if the control device 40 makes an affirmative determination in step S14, the control device 40 switches a second converter 26 into a non-operational state (uncharged state) in step S16. Subsequently, the control device 40 closes the sixth switch SW6 and opens the seventh switch SW7 in step S88, and moves to step S18. That is, if the control device 40 determines that no anomaly has occurred in any of the lines ES1 and ES2 and the second storage battery 16 is not charged, the control device 40 closes the sixth switch SW6. If the control device 40 makes an affirmative determination in step S22, the control device 40 determines in step S90 whether the first switch SW1 is opened. If the control device 40 makes a negative determination in step S90, the control device 40 opens the first switch SW1 in step S92. Subsequently, the control device 40 closes the seventh switch SW7 in step S92. That is, if the control device 40 determines that an anomaly has occurred in the first line ES1, the control device 40 first opens the first switch SW1 and then closes the second switch SW2. Subsequently, the control device 40 outputs a command for bringing the first and second converters 12 and 26 into the non-operational state in step S30, and ends the control process.

If the control device 40 makes an affirmative determination in step S90, that is, if the control device 40 has already performed steps S92 to S96, the control device 40 opens the sixth switch SW6 in step S98, and moves to step S36. Thus, the sixth switch SW6 is opened after the seventh switch SW7 is closed.

On the other hand, If the control device 40 makes a negative determination in step S44, the control device 40 opens the sixth switch SW6 and opens the seventh switch SW7 in step S99, and ends the control process. That is, if the control device 40 determines that no anomaly has occurred in any of the lines ES and ES2 and the second storage battery 16 is charged, the control device 40 opens the sixth switch SW6.

If the control device 40 makes an affirmative determination in step S42, the control device 40 performs steps S100 to S108. Steps S100 to S108 are identical to steps S90 to S98, and thus description thereof will be omitted.

According to the present embodiment described above in detail, the following advantageous effects can be obtained.

In the present embodiment, the first to third diodes DA1 to DA3 are used to regulate the discharge of the second storage battery 16 on the second path LC2. Thus, in the event of an anomaly in the first line ES1, it is possible to supply power from the second storage battery 16 to the second load 36 via the first to third diodes DA1 to DA3. However, the load voltage VD decreases due to the forward voltage drop amounts of the first to third diodes DA1 to DA3. In this respect, in the present embodiment, in the event of an anomaly in the first line ES1, the first switch SW1 is first opened and then the seventh switch SW7 is closed. In the event of an anomaly in the first line ES1, the first switch SW1 is first opened to enable early power supply to the second load 36 by the first to third diodes DA1 to DA3. Then, the seventh switch SW7 is closed to suppress a decrease in the voltage of the second load 36 by the first to third diodes DA1 to DA3.

The load voltage VD varies depending on the amounts of driving the loads 34 and 36.

Thus, if the amounts of driving the loads 34 and 36 temporarily decrease, for example, the load voltage VD may excessively rise. If the load voltage VD excessively rises, it is desired that the second storage battery 16 absorbs the overvoltage. However, in a configuration in which the second converter 26 is provided on the first path LC1 and the first to third diodes DA1 to DA3 are provided on the second path LC2, the flow of current from the connection point PB to the second storage battery 16 via the second converter 26 and the first to third diodes DA1 to DA3 is regulated, so that the second storage battery 16 cannot absorb the overvoltage of the load voltage VD.

In this respect, in the present embodiment, the seventh diode DA7 is connected in parallel to the seventh switch SW7 on the second regulation path LD2 without the first to third diodes DA1 to DA3 of the second path LC2. The seventh diode DA7 is provided to regulate the flow of current from the second storage battery 16 to the connection point PB on the second regulation path LD2 and permit the flow of current from the connection point PB to the second storage battery 16. Thus, if the load voltage VD excessively rises in a state where the seventh switch SW7 is closed, it is possible to cause the second storage battery 16 to absorb the overvoltage via the seventh diode DA7.

In the present embodiment, the seventh diode DA7 is connected in parallel to the seventh switch SW7 so that an overvoltage time when the load voltage VD rises and exceeds the upper limit value of the power supply voltage VA, it is possible to cause the second storage battery 16 to absorb the overvoltage via the seventh diode DA7. This makes it possible to protect the loads 34 and 36 from the overvoltage.

The overvoltage time includes the time of driving an electric power steering device 50 and the time of load dump of a first storage battery 14, for example. At the time of driving the electric power steering device 50, if the amount of driving the electric power steering device 50 temporarily decreases, the load voltage VD excessively rises and enters the overvoltage state. In the present embodiment, at the time of driving the electric power steering device 50, it is possible to cause the second storage battery 16 to absorb the overvoltage via the seventh diode DA7.

The time of load dump of the first storage battery 14 means the switching time at which a connector terminal connecting the first storage battery 14 and a first in-line path LA1 comes off and the first storage battery 14 is switched from the state of being connected to the first in-line path LA1 to the state of being disconnected from the first in-line path LA1.

In a configuration in which the second converter 26 is provided on the first path LC1 and the first to third diodes DA1 to DA3 and the seventh switch SW7 are provided on the second path LC2 as in the present embodiment, when the seventh switch SW7 is opened, the power supply from the second storage battery 16 is regulated so that power is redundantly supplied from the first converter 12 and the first storage battery 14. That is, the power supply from the first converter 12 enables continuous power supply even in long-time driving, and the power supply from the first storage battery 14 enables power supply with less voltage fluctuation. In this case, when the first storage battery 14 is switched from the state of being connected to the first in-line path LA1 to the state of being disconnected from the first in-line path LA1, the voltage fluctuation may become large during the power supply and the load voltage VD may excessively rise and become an overvoltage. In the present embodiment, at the time of load dump of the first storage battery 14, it 5 is possible to cause the second storage battery 16 to absorb the overvoltage via the seventh diode DA7.

If it is determined that no anomaly has occurred in the first line ES1, the second storage battery 16 is charged as appropriate by the power supply voltage VA of the first converter 12. However, if the voltage of the second storage battery 16 temporarily rises at the start of charging the second storage battery 16, for example, there is concern that the second storage battery 16 being charged via the first to third diodes DA1 to DA3 may be discharged.

In this respect, in the present embodiment, the sixth switch SW6 is connected in series to the first to third diodes DA1 to DA3. The sixth switch SW6 is closed if the second storage battery 16 is not charged, and the sixth switch SW6 is opened if the second storage battery 16 is charged.

That is, if the second storage battery 16 is not charged, discharging of the second storage battery 16 via the first to third diodes DA1 to DA3 is permitted, and if the second storage battery 16 is charged, discharging of the second storage battery 16 via the first to third diodes DA1 to DA3 is regulated. Accordingly, it is possible to suppress the discharge of the second storage battery 16 being charged while enabling early power supply to the second load 36 by the first to third diodes DA1 to DA3. [Modification Example of Fifth Embodiment]

Figure 12:
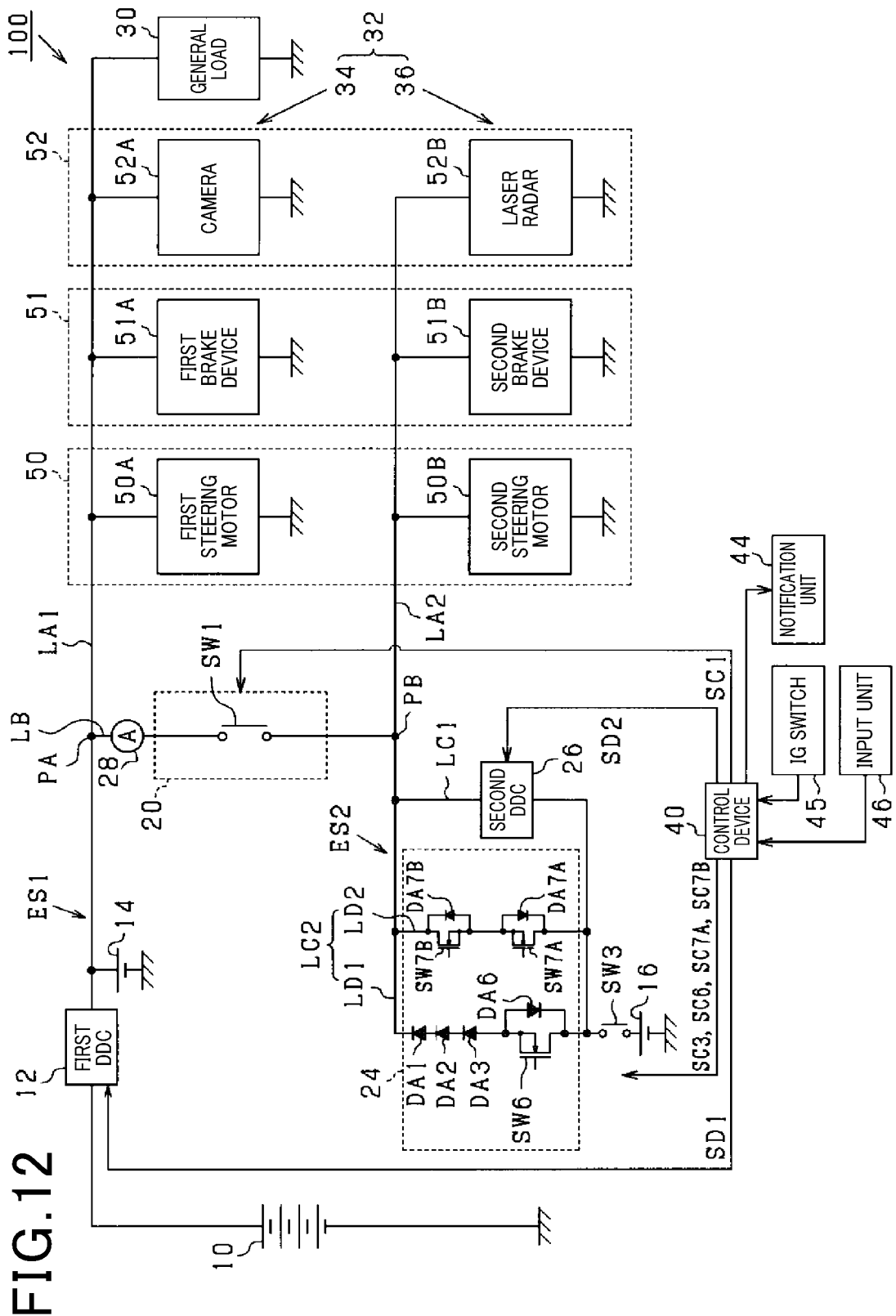
FIG. 12 is a general configuration diagram of a power system in a modification example of the fifth embodiment.

As illustrated in FIG. 12, the seventh switch SW7 may be formed by a seventh A switch SW7A and a seventh B switch SW7B connected in series. On a second regulation path LD2, the seventh B switch SW7B is provided closer to a connection path LB than the seventh A switch SW7A.

In the present embodiment, MOSFETs are used as the seventh A and seventh B switches SW7A and SW7B. In a control process, a control device 40 generates seventh A and seventh B switching signals SC7A and SC7B for operating the seventh A and seventh B switches SW7A and SW7B, and outputs commands by the seventh A and seventh B switching signals SC7A and SC7B to the seventh A and seventh B switches SW7A and SW7B. In the present modification example, the seventh A switch SW7A corresponds to a "first changeover switch", and the seventh B switch SW7B corresponds to a "second changeover switch".

A seventh A diode DA7A is connected as a parasitic diode in parallel to the seventh A switch SW7A, and a seventh B diode DA7B is connected as a parasitic diode in parallel to the seventh B switch SW7B. In the present embodiment, the seventh A and seventh B diodes DA7A and DA7B are connected in series such that the seventh A and seventh B diodes DA7A and DA7B are oriented in opposite directions. More specifically, the seventh A parasitic diode DA7A is arranged such that the anode is located on the connection path LB side and the cathode is located on a second storage battery 16 side. The seventh B parasitic diode DA7B is arranged such that the anode is located on the second storage battery 16 side and the cathode is located on the connection path LB side. In the present modification example, the seventh A parasitic diode DA7A corresponds to a "charging permission unit".

If it is determined that no anomaly has occurred in any of lines ES1 and ES2, the second storage battery 16 is charged as appropriate at a power supply voltage VA of a first converter 12, and the charging of the second storage battery 16 switches SW7A and SW7B is regulated by the seventh A and seventh B. However, in a configuration in which the seventh A diode DA7A is connected in parallel to the seventh A switch SW7A, if the seventh A switch SW7A is opened but the seventh B switch SW7B is closed, for example, the second storage battery 16 is charged via the seventh A diode DA7A. Thus, there is concern that the charging of the second storage battery 16 may not be regulated by the seventh A and seventh B switches SW7A and SW7B. Thus, in the present modification example, the opening and closing of the seventh A and seventh B switches SW7A and SW7B are switched as appropriate in the control process.

Figure 13:
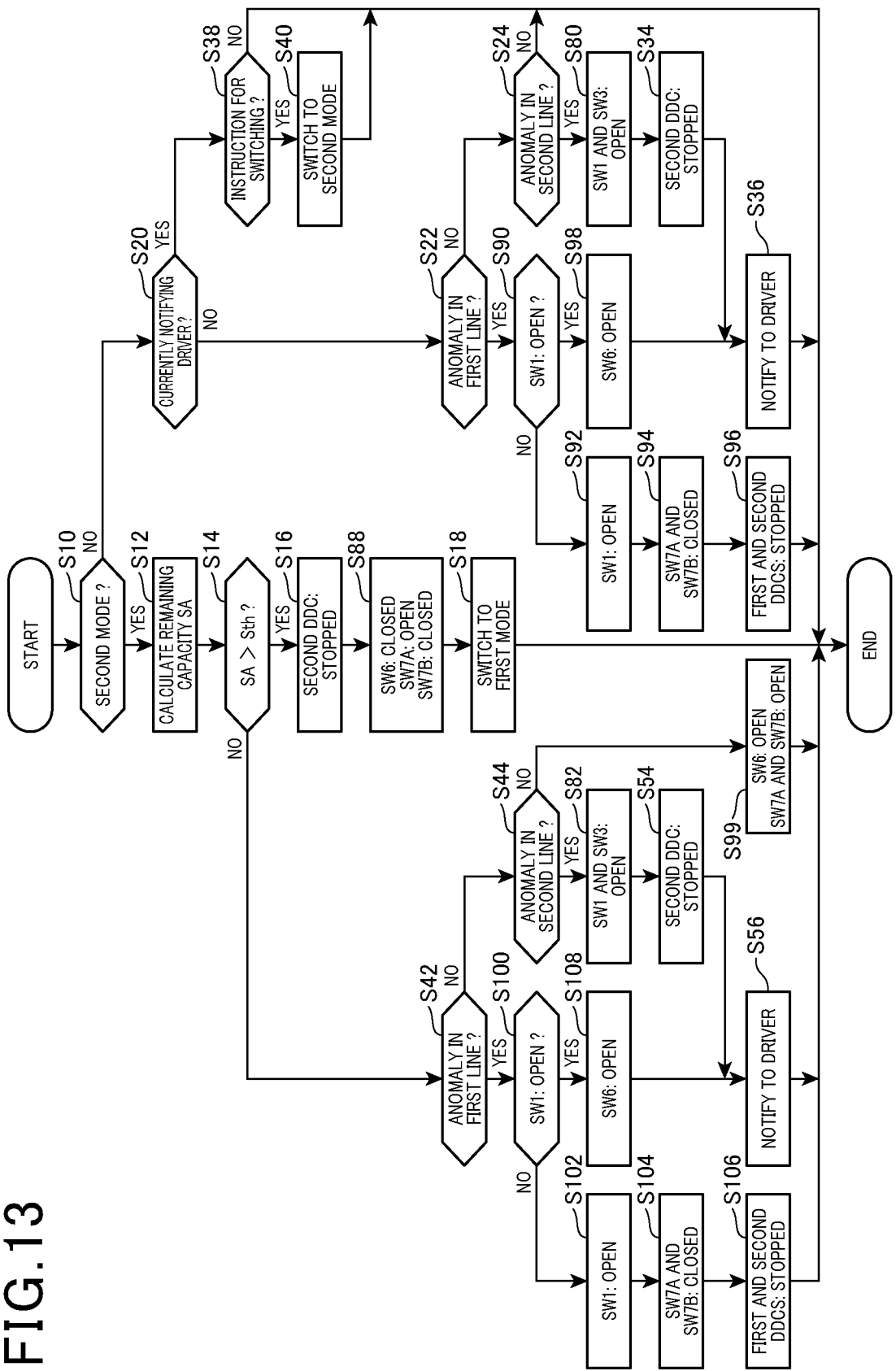
FIG. 13 is a flowchart of a procedure of a control process in the modification example of the fifth embodiment.

As illustrated in FIG. 13, in the control process of the present modification example, in step S88 in which the seventh switch SW7 is opened, the seventh A switch SW7A is opened and the seventh B switch SW7B is closed. That is, if it is determined that no anomaly has occurred in any of the lines ES1 and ES2 and the second storage battery 16 is not charged, the seventh A switch SW7A is opened and the seventh B switch SW7B is closed. Accordingly, if the second storage battery 16 is not charged, it is possible to cause the second storage battery 16 to absorb the overvoltage via the seventh B switch SW7B and the seventh A diode DA7A.

On the other hand, in step S99 in which the seventh switch SW7 is opened, the seventh A and seventh B switches SW7A and SW7B are opened. That is, if it is determined that no anomaly has occurred in any of the lines ES1 and ES2 and the second storage battery 16 is charged, the seventh A and seventh B switches SW7A and SW7B are opened. Accordingly, if the second storage battery 16 is charged, the charging of the second storage battery 16 via the seventh A diode DA7A can be restricted. According to the present modification example described above in detail, it is possible to properly regulate the charging of the second storage battery 16 while enabling the absorption of the overvoltage by the second storage battery 16.

Sixth Embodiment

Hereinafter, a sixth embodiment will be described, centering on differences from the first embodiment, with reference to FIG. 14.

The present embodiment is different from the first embodiment in that in a control process, if a boost condition requiring the voltage of a second storage battery 16 to be higher than a power supply voltage VA, that is, requiring the second storage battery 16 to be at a high voltage is satisfied, a secondary converter 26 boosts the voltage of the second storage battery 16. That is, only if the boost condition is satisfied, the voltage of the second storage battery 16 is made higher than the power supply voltage VA. If the boost condition is not satisfied, the second storage battery 16 is charged by the power supply voltage VA of a first converter 12 at a voltage equal to or lower than the power supply voltage VA. Thus, the second converter 26 does not need to perform the boost operation.

The boost condition is satisfied if a power system 100 is in a predetermined low-temperature state or the driving of the vehicle is in a first mode, for example. Thus, the present embodiment is different from the first embodiment in that if the boost condition is that the driving mode of the vehicle is the first mode, the driving mode of the vehicle is first switched to the first mode, and then the second storage battery 16 is turned to a high voltage.

Figure 14:
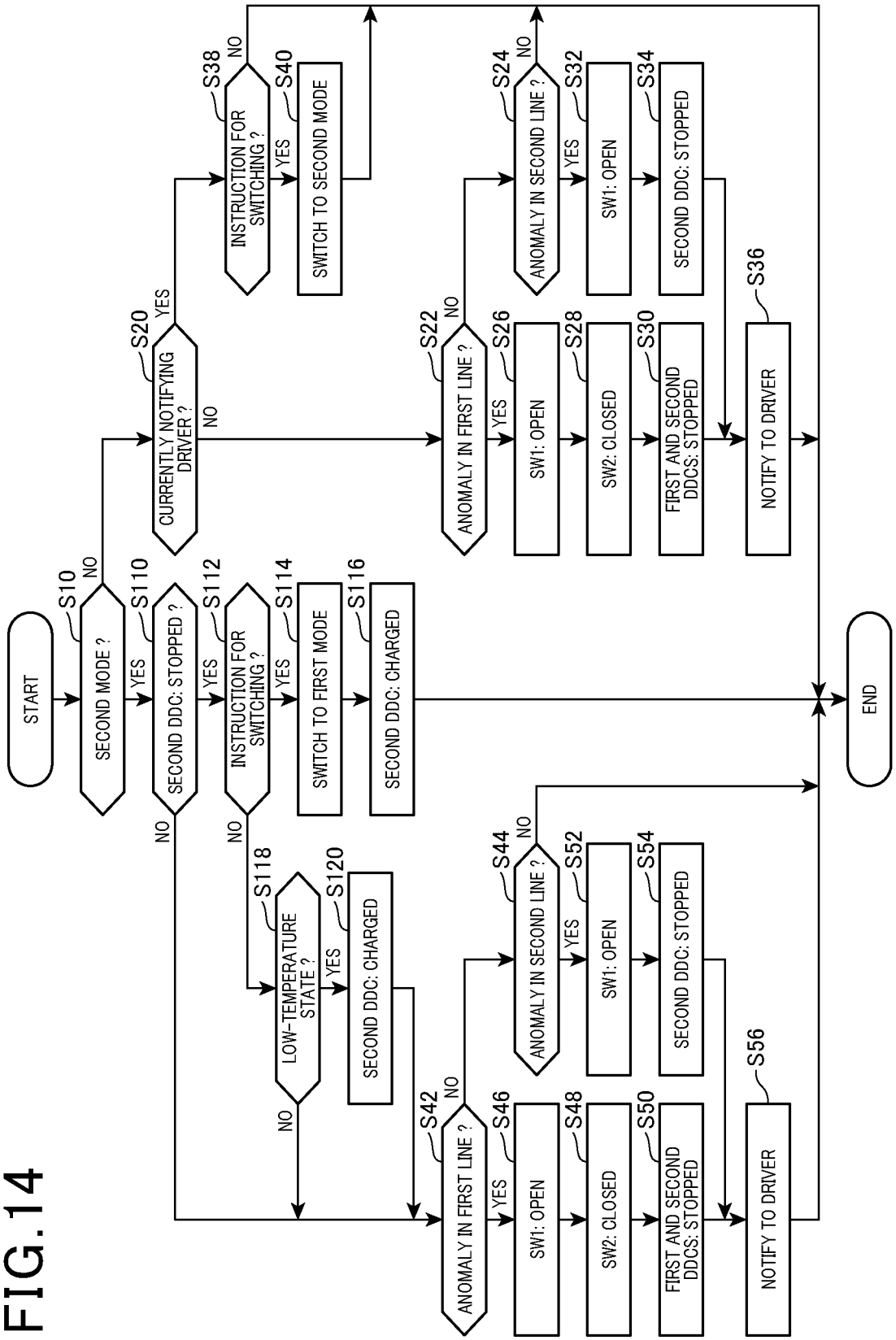
FIG. 14 is a flowchart of a procedure of a control process in a sixth embodiment.

FIG. 14 is a flowchart of the control process in the present embodiment. Steps described in FIG. 14 identical to the steps described in FIG. 2 are given identical step numbers for the sake of convenience, and description thereof will be omitted.

In the control process of the present embodiment, If a control device 40 makes an affirmative determination in step S10, the control device 40 determines in step S110 whether the second converter 26 is in a non-operational state. For example, if the power system 100 is in the low-temperature state and no instruction for switching is input by the driver, the driving mode of the vehicle is a second mode and the second converter 26 is in the operational state. In this case, the control device 40 makes a negative determination in step S110, and the process proceeds to steps S42 and S44.

On the other hand, If the control device 40 makes an affirmative determination in step S110, the control device 40 determines in step S112 whether an instruction for switching to the first mode has been input by the driver via an input unit 46. If the control device 40 makes an affirmative determination in step S112, the control device 40 switches the driving mode of the vehicle from the second mode to the first mode in step S114, and outputs a command for bringing the second converter 26 into the operational state in step S116, and ends the control process.

On the other hand, If the control device 40 makes a negative determination in step S112, the control device 40 determines in step S118 whether the power system 100 is in the low-temperature state. The low-temperature state here is a state in which the surrounding temperature of the vehicle is zero or lower. If the control device 40 makes a negative determination in step S118, the control device 40 moves to steps S42 and S44. On the other hand, If the control device 40 makes an affirmative determination in step S98, the control device 40 outputs a command for bringing the second converter 26 into the operational state in step S120, and moves to steps S42 and S44.

That is, if the boost condition is satisfied because the power system 100 is in the low-temperature state or the driving mode of the vehicle is switched to the first mode, the control device 40 outputs a command for turning the second converter 26 into the operational state to cause the second converter 26 to boost the voltage. Accordingly, the second storage battery 16 is charged at a higher voltage than the power supply voltage VA. The charging of the second storage battery 16 is ended when the second storage battery 16 is fully charged. In the present embodiment, steps S96 and S100 correspond to a "boost control unit".

According to the present embodiment described above in detail, the following advantageous effects can be obtained.

In a configuration in which the second storage battery 16 is at a higher voltage than the power supply voltage VA of the first converter 12 by charging the second converter 26, it is possible to properly supply power from the second storage battery 16 to the second load 36 in the event of an anomaly in the first line ES1. On the other hand, there is concern that in a situation where the first line ES1 is maintained in the normal state, electric energy may be excessively used. In this respect, in the present embodiment, the second storage battery 16 is charged by causing the second converter 26 to boost the voltage only if the boost condition is satisfied, so that it is possible to suppress excessive use of the electric energy.

For example, if the power system 100 is in the low-temperature state, it is considered that a high voltage is required to operate the second load 36 in supplying power from the second storage battery 16 to the second load 36. In this respect, in the present embodiment, if the power system 100 is in the low-temperature state, the voltage of the second storage battery 16 can be properly adjusted as necessary by changing the degree of voltage boosting by the second converter 26 in accordance with the surrounding temperature of the vehicle including the power system 100.

The first load 34 and the second load 36 are loads that perform functions necessary for driving the vehicle and driving assistance functions. It is possible to switch the driving of the vehicle between the driving in the first mode using the driving assistance functions and the driving in the second mode not using the driving assistance functions. If the driving mode of the vehicle is the first mode, it is necessary to apply a high voltage to the second load 36 in order to perform a proper fail-safe process in the event of an anomaly in the first line ES1. In this respect, if the driving mode of the vehicle is the first mode, the voltage of the second storage battery 16 can be properly adjusted as necessary by causing the second converter 26 to boost the voltage of the second storage battery 16.

Seventh Embodiment

Hereinafter, a seventh embodiment will be described, centering on differences from the third embodiment, with reference to FIGS. 15 to 17.

Figure 15:
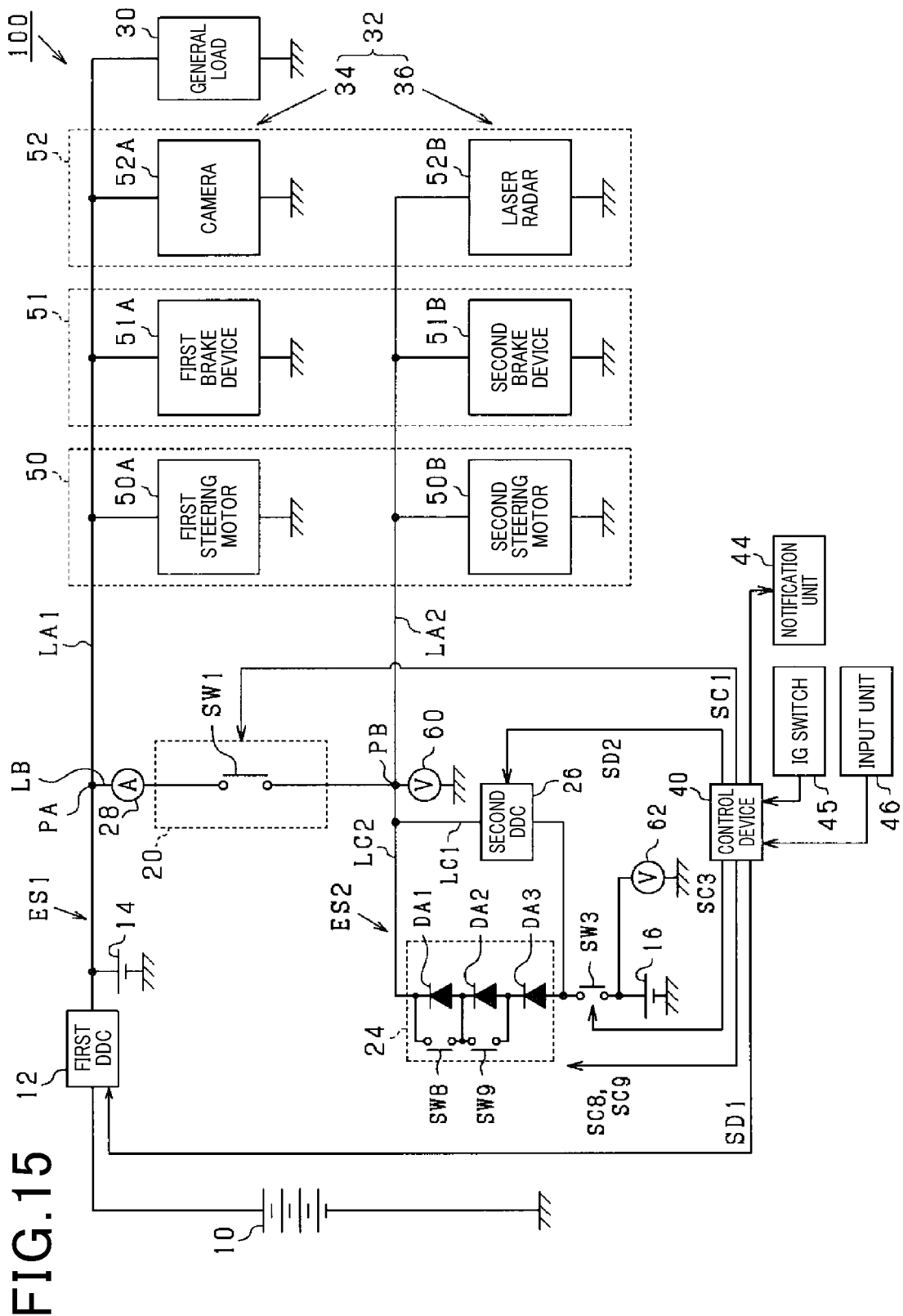
FIG. 15 is a general configuration diagram of a power system in a seventh embodiment.

The present embodiment is different from the third embodiment in that a second switch part 24 includes eighth and ninth switching elements (hereinafter, simply called eighth and ninth switches) SW8 and SW9 as illustrated in FIG. 15. The eighth switch SW8 is connected in parallel to a first diode DA1, and the ninth switch SW9 is connected in parallel to a second diode DA2. No switching elements connected in parallel are provided in a third diode DA3. In the present embodiment, MOSFETs are used as the eighth and ninth switches SW8 and SW9. In a control process, a control device 40 generates eighth and ninth switching signals SC8 and SC9 for operating the eighth and ninth switches SW8 and SW9, and outputs commands by the eighth and ninth switching signals SC8 and SC9 to the eighth and ninth switches SW8 and SW9.

In the present embodiment, the voltage difference generated by the first to third diodes DA1 to DA3 is variable. Specifically, the voltage difference generated by the first to third diodes DA1 to DA3 can be switched by opening and closing of the eighth and ninth switches SW8 and SW9. The eighth switch SW8 constitutes a path that bypasses the first diode DA1 when being closed. When the eighth switch SW8 is closed, the first diode DA1 becomes non-conductive so that the forward voltage drop amount of the first diode DA1 is no longer generated. On the other hand, when the eighth switch SW8 is opened, the first diode DA1 becomes conductive so that the forward voltage drop amount of the first diode DA1 is generated. Accordingly, the voltage difference generated by the first to third diodes DA1 to DA3 is switched. The same thing applies to the ninth switch SW9. In the present embodiment, the eighth and ninth switches SW8 and SW9 correspond to a "bypass switch".

In the present embodiment, first and second voltage detection units 60 and 62 are provided. The first voltage detection unit 60 is connected to a connection point PB between a second in-line path LA2 and a connection path LB to detect a load voltage VD that is the voltage of the connection point PB. The second voltage detection unit 62 is connected to a portion of the second in-line path LA2 between a second storage battery 16 and a third switch SW3 to detect a storage battery voltage VB that is the voltage of the second storage battery 16.

Figure 16:
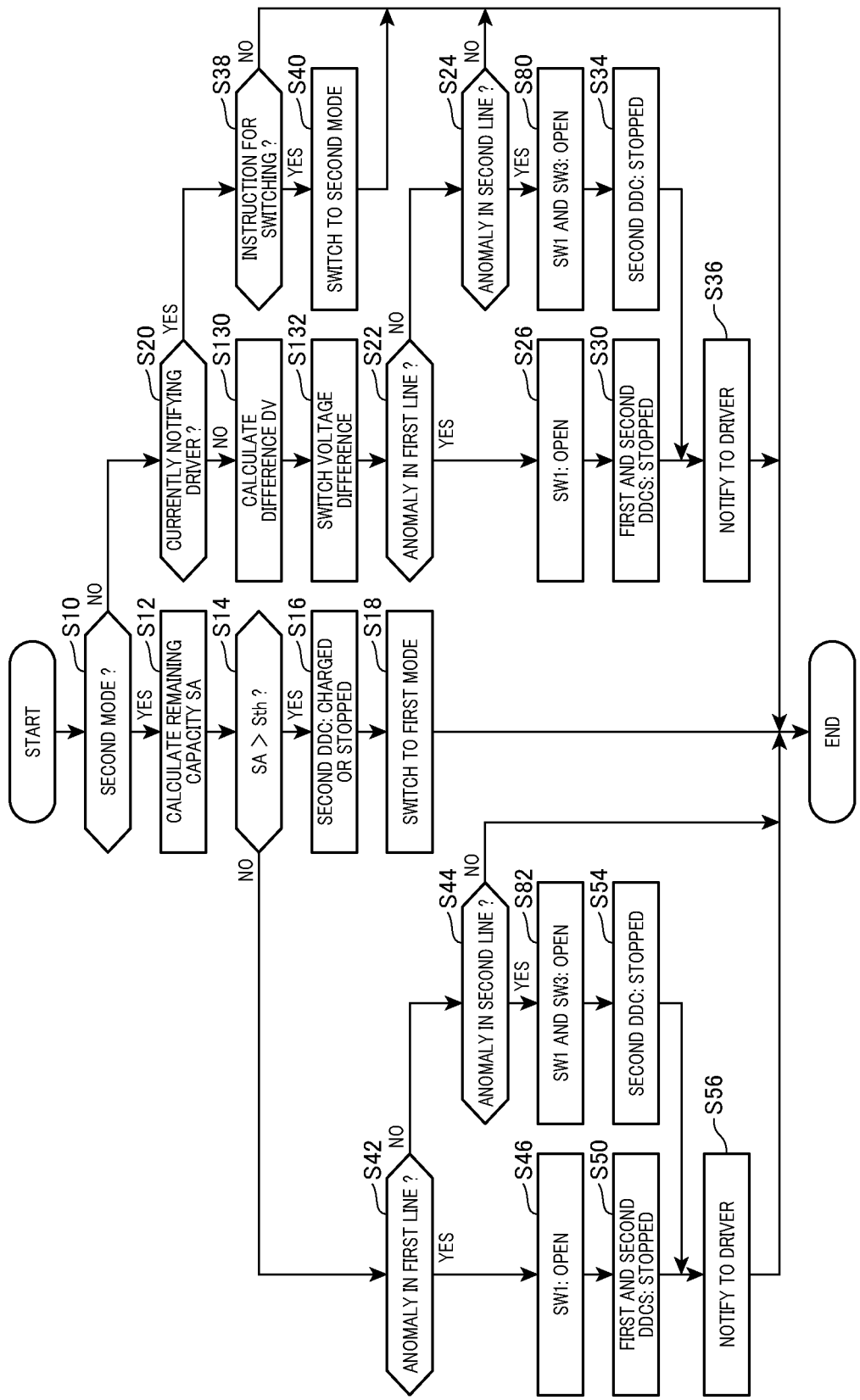
FIG. 16 is a flowchart of a procedure of a control process in the seventh embodiment.

FIG. 16 is a flowchart of the control process in the present embodiment. Steps described in FIG. 16 identical to the steps described in FIG. 7 are given identical step numbers for the sake of convenience, and description thereof will be omitted. At the closing of an IG switch 45, the eighth and ninth switches SW8 and SW9 are initially opened.

In the control process of the present embodiment, If the control device 40 makes an affirmative determination in step S20, the control device 40 calculates a difference DV that is a voltage difference between the load voltage VD and the storage battery voltage VB in step S130. The difference DV is calculated using the load voltage VD detected by the first voltage detection unit 60 and the storage battery voltage VB detected by the second voltage detection unit 62.

Subsequently, the control device 40 switches the voltage difference generated by the first to third diodes DA1 to DA3 in step S132, based on the difference DV calculated in step S130. Specifically, the control device 40 determines whether the difference DV is larger than predetermined first and second switching thresholds Dth and Dth2, and switches the voltage difference generated by the first to third diodes DA1 to DA3 based on the determination result. In the present embodiment, the forward voltage drop amounts of the diodes DA1 to DA3 are all VF, the first switching threshold Dth1 is set to be a voltage difference that is larger than twice the forward voltage drop amount VF and is smaller than three times of the forward voltage drop amount VF. The second switching threshold Dth2 is set to be a voltage difference that is larger than the forward voltage drop amount VF and is smaller than twice the forward voltage drop amount VF.

If the difference DV is larger than the first switching threshold Dth1, the control device 40 opens the eighth and ninth switches SW8 and SW9 in step S132. If the difference DV is smaller than the first switching threshold Dth1 and larger than the second switching threshold Dth2, the control device 40 closes the eighth switch SW8 and opens the ninth switch SW9. If the difference DV is smaller than the second switching threshold Dth2, the control device 40 closes the eighth and ninth switches SW8 and SW9. Accordingly, the number of diodes that becomes conductive between the connection point PB to the connection path LB and the second storage battery 16 is changed to switch the voltage difference generated by the first to third diodes DA1 to DA3. More specifically, as the voltage difference generated by the first to third diodes DA1 to DA3 is larger, the voltage difference generated by the first to third diodes DA1 to DA3 is switched to a larger value. In the present embodiment, step S132 corresponds to a "voltage difference switch unit".

Figure 17:
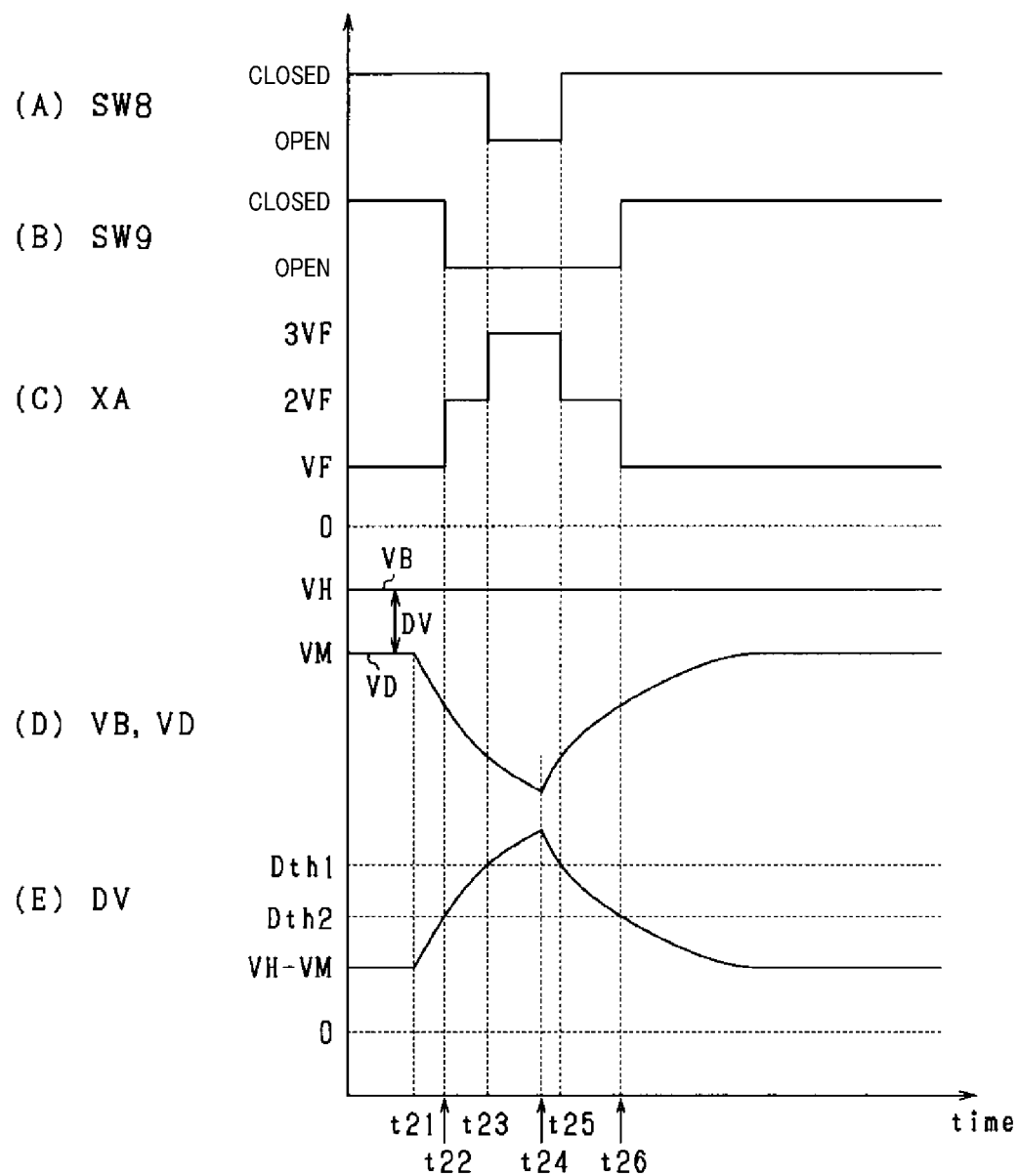
FIG. 17 is a time chart of an example of the control process in the seventh embodiment.

FIG. 17 illustrates an example of the control process. FIG. 17 illustrates transition of a voltage difference XA generated by the first to third diodes DA1 to DA3 when the driving amount of the loads 34 and 36 temporarily increases during driving of the vehicle in the first mode with the first line ES1 in the normal state.

In FIG. 17, (A) illustrates the transition of state of the eighth switch SW8, (B) illustrates the transition of state of the ninth switch SW9, and (C) illustrates the transition of the voltage difference XA generated by the first to third diodes DA1 to DA3. In addition, (D) illustrates the transition of the storage battery voltage VB and the load voltage VD, and (E) illustrates the transition of the difference DV between the load voltage VD and the storage battery voltage VB. As illustrated in FIG. 17, in a period until time t21 when the amount of driving a specific load 32 starts to increase, the load voltage VD is an operating voltage VM, and the storage battery voltage VB is a boost voltage VH. Thus, the difference DV between the load voltage VD and the storage battery voltage VB is (VH-VM). Since the difference DV is smaller than the second switching threshold Dth2, the eighth and ninth switches SW8 and SW9 are closed. That is, the voltage difference XA generated by the first to third diodes DA1 to DA3 is the forward voltage drop amount VF.

When the amount of driving the loads 34 and 36 starts to increase at time t21, the load voltage VD decreases accordingly. On the other hand, the storage battery voltage VB is maintained at a constant value by the second switch unit 24, and thus the difference DV between the load voltage VD and the storage battery voltage VB increases. Then, when the difference DV becomes larger than the second switching threshold Dth2 at time t22, the ninth switch SW9 is opened and the voltage difference XA is switched to a value twice the forward voltage drop amount VF. Further, when the difference DV becomes larger than the first switching threshold Dth1 at time t23, the eighth switch SW8 is opened and the voltage difference XA is switched to a value three times the forward voltage drop amount VF.

After that, the increase of the amount of driving the loads 34 and 36 ends at time t24, the load voltage VD increases and the difference DV decreases. When the difference DV becomes smaller than the first switching threshold Dth1 at time t25, the eighth switch SW8 is closed and the voltage difference XA is switched to a value twice the forward voltage drop amount VF. Further, when the difference DV becomes smaller than the second switching threshold Dth2 at time t26, the ninth switch SW9 is closed and the voltage difference XA is switched to the forward voltage drop amount VF.

According to the present embodiment described above in detail, it is possible to obtain the following advantageous effects.

If no anomaly has occurred in the first line ES1, that is, if the voltage of the first line ES1 is normal, the load voltage VD of the connection point PB and the storage battery voltage VB of the second storage battery 16 are held with the difference DV defined by the voltage difference generated by the first to third diodes DA1 to DA3. In that state, the discharge from the second storage battery 16 to the connection point PB is regulated.

However, the storage battery voltage VB varies depending on the surrounding temperature of the vehicle including the power system 100 and the degree of deterioration of the second storage battery 16, for example, and the load voltage VD varies depending on the amounts of driving the loads 34 and 36. In this case, if the voltage difference generated by the first to third diodes DA1 to DA3 takes on a constant value, the voltage difference may be small or large with respect to the difference DV between the load voltage VD and the storage battery voltage VB. If the voltage difference generated by the first to third diodes DA1 to DA3 is small with respect to the difference DV, there is concern that unnecessary discharge of the second storage battery 16 may not be regulated. On the other hand, if the voltage difference generated by the first to third diodes DA1 to DA3 is large with respect to the difference DV, there is concern that when power is supplied from the second storage battery 16 in the second line ES2 due to the occurrence of an anomaly in the first line ES1, the voltage applied to the second load 36 may decrease due to the excessive potential difference generated by the first to third diodes DA1 to DA3, and the second load 36 may not properly operate at the start of power supply from the second storage battery 16. In this respect, in the present embodiment, the voltage difference generated by the first to third diodes DA1 to DA3 is variable, and the voltage difference is switched based on the difference DV between the load voltage VD and the storage battery voltage VB. More specifically, as the difference DV between the load voltage VD and the storage battery VB is larger than the switching thresholds Dth1 and Dth2, the voltage difference generated by the first to third didoes DA1 to DA3 is set to a larger value. Accordingly, if the difference DV between the load voltage VD and the storage battery VB is large, the voltage difference generated by the first to third didoes DA1 to DA3 can be set to a large value, and if the difference DV between the load voltage VD and the storage battery VB is small, the voltage difference generated by the first to third didoes DA1 to DA3 can be set to a small value, so that it is possible to properly supply power to the electrical loads 34 and 36.

In the present embodiment, the first to third diodes DA1 to DA3 connected in series are provided, and among the first to third diodes DA1 to DA3, the first and second diodes DA1 and DA2 are provided with the eighth and ninth switches SW8 and SW9 connected in parallel. The voltage difference generated by the first to third diodes DA1 to DA3 is switched by using the eighth and ninth switches SW8 and SW9 to change the number of the diodes to be conductive among the first to third diodes DA1 to DA3. In the first to third diodes DA1 to DA3 connected in series, the voltage difference is generated by the first to third diodes DA1 to DA3 due to the forward voltages of the diodes in the conductive state. Thus, the voltage difference can be switched by changing the number of the diodes to be conductive. [Modification Example of Seventh Embodiment]

Figure 18:
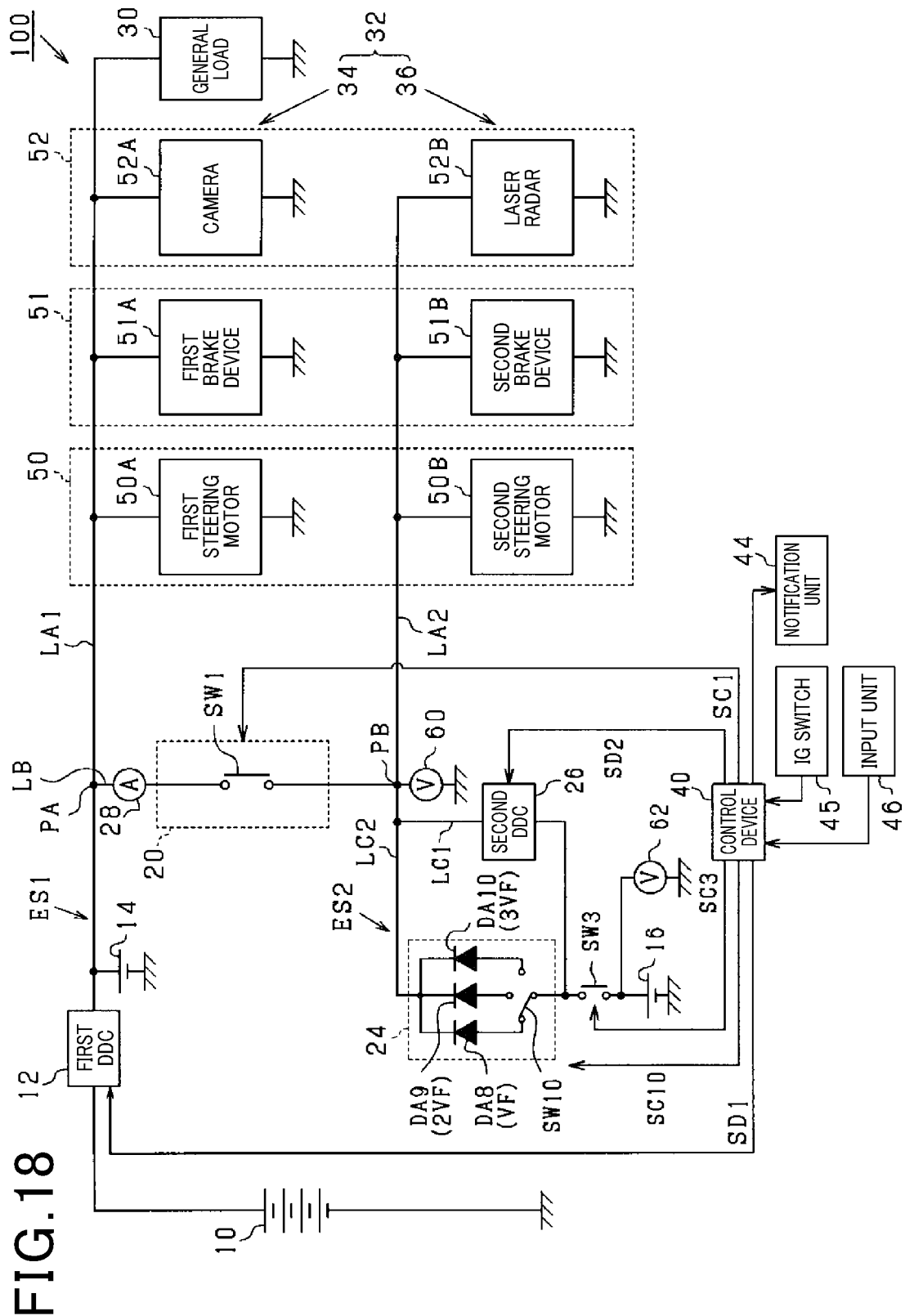
FIG. 18 is a general configuration diagram of a power system in a modification example of the seventh embodiment.

As illustrated in FIG. 18, a second switch unit 24 may include eighth to tenth diodes DA8 to DA10 connected in parallel to one another. The diodes DA8 to DA10 are arranged such that the cathodes are located on a connection point PB side to a connection path LB and the anodes are located on a second storage battery 16 side. The diodes DA8 to DA10 regulate the flow of current from the connection point PB to the second storage battery 16 on a second path LC2.

The diodes DA8 to DA10 have different forward voltage drop amounts. In the present modification example, the forward volage drop amount VF of the eighth diode DA8 is VF, the forward voltage drop amount of the ninth diode DA9 takes on a value twice the forward voltage drop amount VF, and the forward voltage drop amount of the tenth diode DA10 takes on a value three times VF.

In the present modification example, the second switch unit 24 includes a tenth switching element (hereinafter, simply called tenth switch) SW10. The tenth switch SW10 is provided between the anodes of the diodes DA8 to DA10 and a third switch SW3 to connect the anode of one of the eighth to tenth diodes DA8 to DA10 and the third switch SW3. Accordingly, the one of the eighth to tenth diodes DA8 to DA10 becomes conductive, and the other diodes become non-conductive. In a control process, a control device 40 generates a tenth switching signal SC10 for operating the tenth switch SW10, and outputs a command by the tenth switching signal SC10 to the tenth switch SW10. In the present modification example, the tenth switch SW10 corresponds to a "connection unit".

In the control process of the present modification example, the control device 40 changes the diode to be conductive by the tenth switch SW10 based on a difference DV between a load voltage VD and a storage battery voltage VB in step S132. Specifically, if the difference DV is larger than a first switching threshold Dth1, the control device 40 brings the tenth diode DA10 into the conductive state. If the difference DV is smaller than the first switching threshold Dth1 and larger than a second switching threshold Dth2, the control device 40 brings the ninth diode DA9 into the conductive state. If the difference DV is smaller than the second switching threshold Dth2, the control device 40 brings the eighth diode DA8 into the conductive state. Accordingly, the voltage difference generated by the eighth to tenth diodes DA8 to DA10 is switched.

According to the present modification example described above in detail, the eighth to tenth diodes DA8 to DA10 connected in parallel to one another and different in forward voltage drop amount are provided, and the tenth switch SW10 is provided to selectively bring one of the eighth to tenth didoes DA8 to DA10 into the conductive state. The tenth switch SW10 is used to change the diode to be conductive among the eighth to tenth didoes DA8 to DA10 to switch the voltage difference generated by the eighth to tenth diodes DA8 to DA10. Since the eighth to tenth diodes DA8 to DA10 in parallel to one another are different in forward voltage, the voltage difference is generated by the eighth to tenth diodes DA8 to DA10 due to the forward voltage of the diode in the conductive state. Thus, the voltage difference can be switched by changing the diode to be conductive.

Eighth Embodiment

Figure 20:
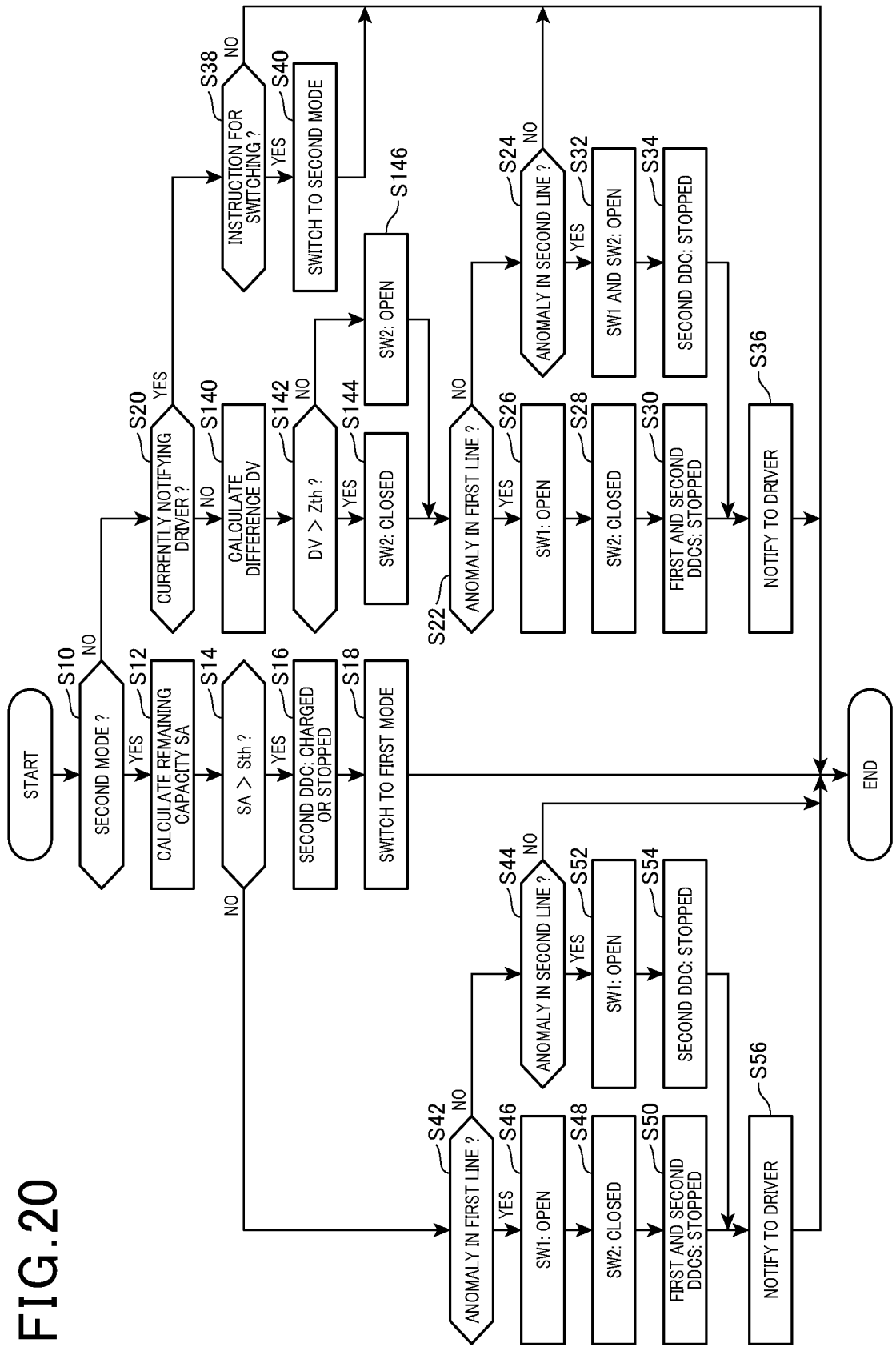
FIG. 20 is a flowchart of a procedure of a control process in the eighth embodiment.
Figure 21:
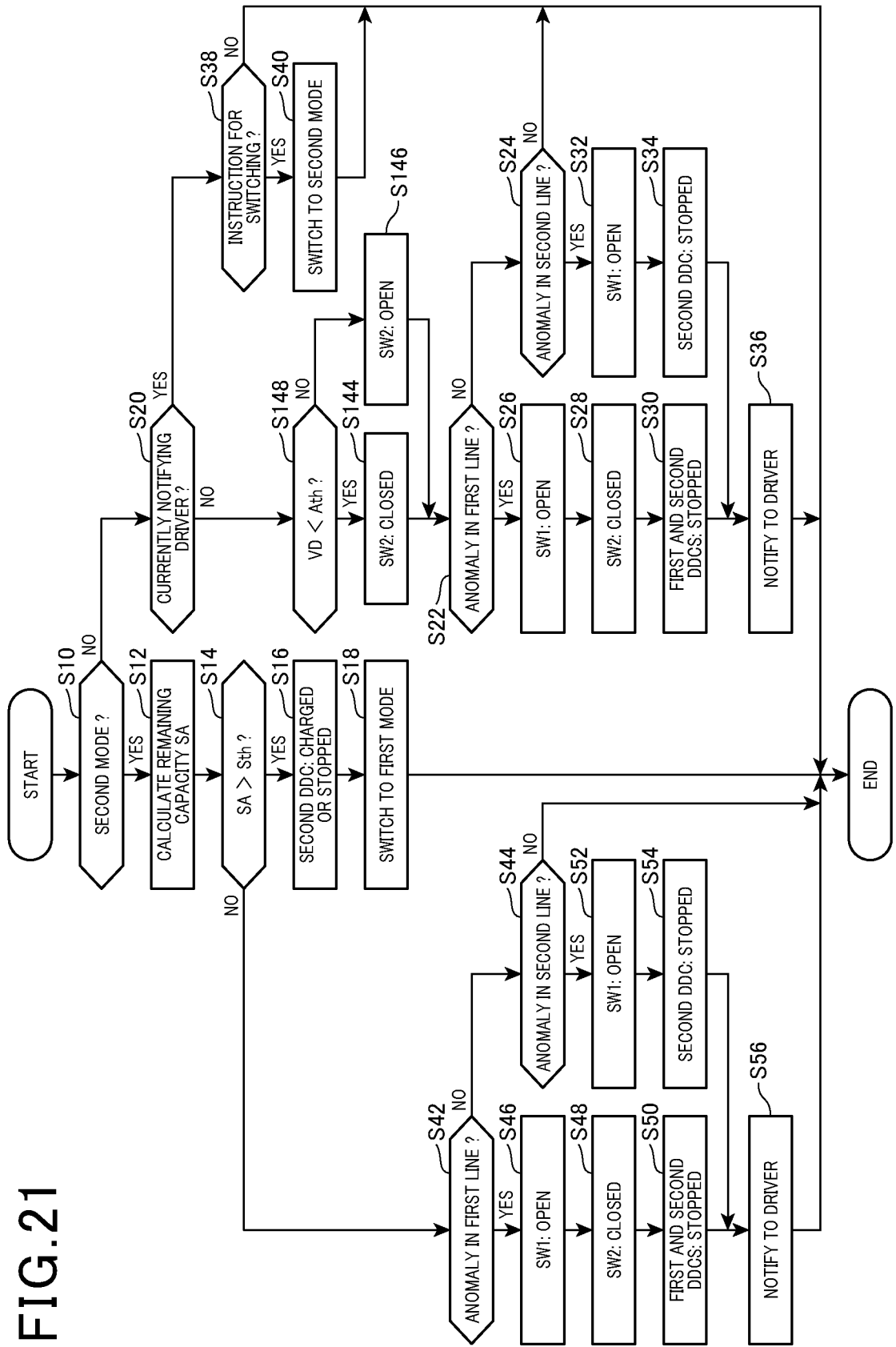
FIG. 21 is a flowchart of a procedure of a control process in a modification example of the eighth embodiment.

Hereinafter, an eighth embodiment will be described, centering on differences from the first embodiment, with reference to FIGS. 19 to 21.

The present embodiment is different from the first embodiment in that, a control device 40 determines, as an anomaly in a first line ES1, not only a power fault such as a ground fault or a disconnection but also an anomaly involving a voltage decrease in the first line ES1. The anomaly involving a voltage decrease in the first line ES1 includes, in addition to power source faults, a temporary decrease in a load voltage VD due to a temporary increase in the amount of driving a specific load 32.

Figure 19:
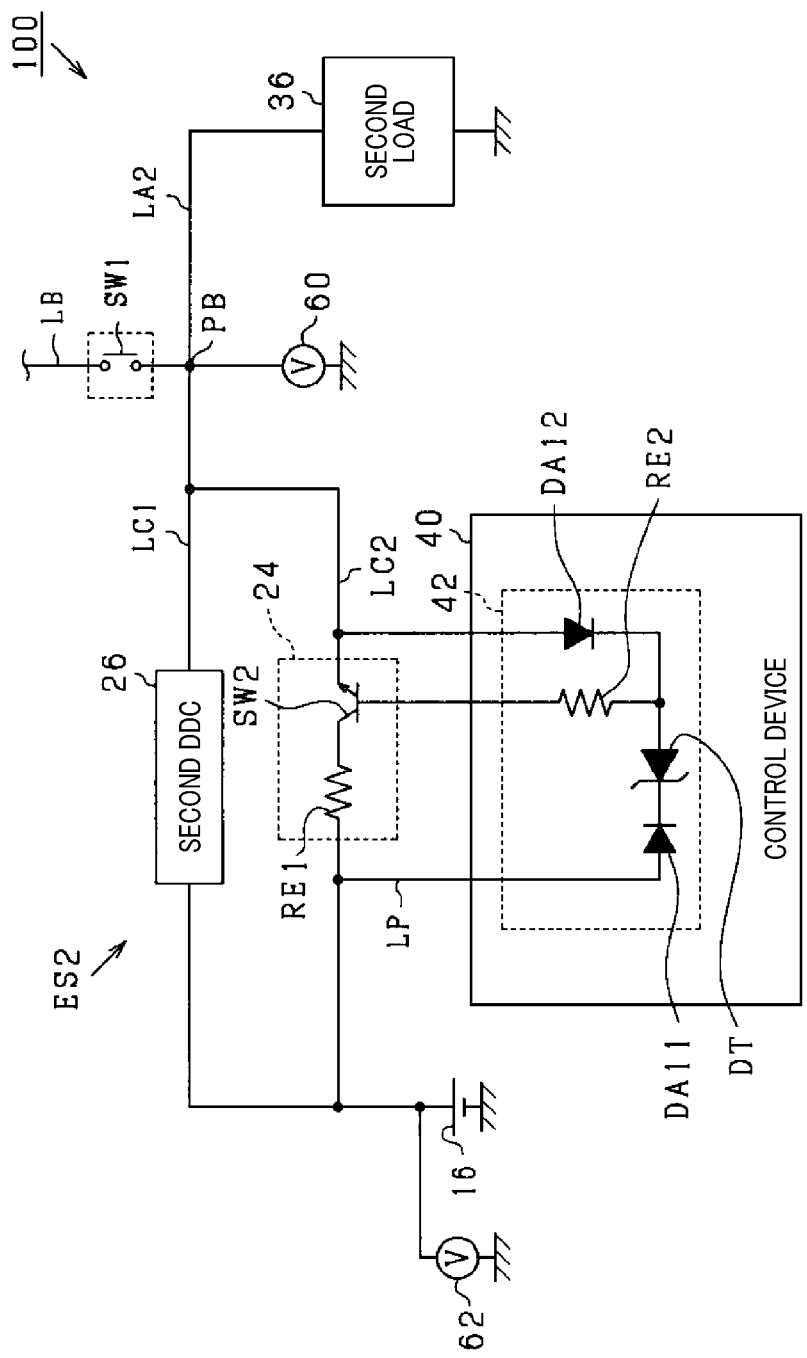
FIG. 19 is a general configuration diagram of a power system in an eighth embodiment.

As illustrated in FIG. 19, a control device 40 includes a control circuit 42 that determines a voltage decrease in the first line ES1. The control device 40 has a bypass path LP that bypasses a second switch unit 24 on a second path LC2. The bypass path LP is provided with a control circuit 42.

It should be noted that FIG. 19 does not illustrate a first line ES1, a current detection unit 28, a notification unit 44, an IG switch 45, and an input unit 46 for ease of understanding. In the present embodiment, as in the seventh embodiment, first and second voltage detection units 60 and 62 are provided. Further, in the present embodiment, a first resistance RE1 is provided in the second switch unit 24. In the present embodiment, an IGBT is used as a second switch SW2, and the collector of the second switch SW2 is connected to a second storage battery 16, and the emitter of the second switch SW2 is connected to a connection point PB to a connection path LB. The first resistance RE1 is connected between the collector of the second switch SW2 and the second storage battery 16 on the second path LC2, and suppresses the occurrence of an inrush current when the second switch SW2 is closed.

The control circuit 42 includes an eleventh diodes DA11, a Zener diode DT, and a twelfth diode DA12 connected in series to one another. The eleventh diode DA11, the Zener diode DT, and the twelfth diode DA12 are provided on the bypass path LP and are aligned in this order from the second storage battery 16 to the connection point PB to the connection path LB. The eleventh diode DA1*l* is arranged such that the cathode is located on the connection point PB side to the connection path LB and the anode is located on the second storage battery 16 side. On the other hand, the Zener diode DT and the twelfth diode DA12 are arranged such that the cathodes are located on the second storage battery 16 side and the anodes are located on the connection point PB side to the connection path LB.

The control circuit 42 further includes a second resistance RE2. The second resistance RE2 is provided on a path that connects a portion of the bypass path LP between the Zener diode DT and the twelfth diode DA12 and on the gate of the second switch SW2.

In the control circuit 42, the voltage applied to the gate of the second switch SW2 is set to be lower than a storage battery voltage VB applied to the emitter and the load voltage VD applied to the collector by the eleventh and twelfth diodes DA1*l* and DA12. The eleventh diode DA1*l* permits discharge from the second storage battery 16 to the gate of the second switch SW2 via the bypass path LP but the discharge is regulated by the Zener diode DT.

In this case, if the load voltage VD temporarily decreases due to a temporary increase in the amount of driving a specific load 32, for example, a difference DV between the load voltage VD and the storage battery voltage VB becomes larger than a predetermined difference threshol. Zth and the discharge from the second storage battery 16 to the gate of the second switch SW2 is performed via the Zener diode DT. The difference threshold Zth is a voltage difference with which the inverse voltage of the Zener diode DT is a Zener voltage. Accordingly, if the voltage applied to the gate of the second switch SW2 increases, the second switch SW2 is closed. That is, the control circuit 42 is a circuit that closes the second switch SW2 if the difference DV between the load voltage VD and the storage battery voltage VB becomes larger than the difference threshold Zth.

The control device 40 restricts the operation of the control circuit 42, and operates the control circuit 42 at a predetermined timing in the control process. FIG. 20 is a flowchart of the control process in the present embodiment. Steps described in FIG. 20 identical to the steps described in FIG. 2 are given identical step numbers for the sake of convenience, and description thereof will be omitted. At the closing of an IG switch 45, the operation of the control circuit 42 is initially stopped.

In the control process of the present embodiment, if the control device 40 makes an affirmative determination in step S20, that is, if no notification is provided to the driver in a first mode and a first switch SW1 is in the closed state, the control device 40 calculates the difference DV between the load voltage VD and the storage battery voltage VB in step S140. The difference DV is calculated by using the load voltage VD that is the voltage of the connection point PB detected by a first voltage detection unit 60 and the storage battery voltage VB that is the voltage of the second storage battery 16 detected by a second voltage detection unit 62.

Subsequently, the control device 40 determines in step S142 whether the difference DV calculated in step S140 is larger than the difference threshold Zth. If the difference DV is larger than the difference threshold Zth, the control device 40 determines that there has occurred an anomaly involving a voltage decrease in the first line ES1, and makes an affirmative determination in step S142. In this case, the control device 40 closes the second switch SW2 by the control circuit 42 in step S144, and moves to step S22.

On the other hand, if the difference DV is smaller than the difference threshold Zth, the control device 40 determines that there has not occurred an anomaly involving a voltage decrease in the first line ES1, and makes a negative determination in step S142. In this case, the control device 40 opens the second switch SW2 in step S146, and moves to step S22. The case where it is determined that there has not occurred an anomaly involving a voltage decrease in the first line ES1 includes a case where the temporary decrease of the load voltage VD has been eliminated.

Thus, in step S28, if the second switch SW2 is opened, the control device 40 closes the second switch SW2, and if the second switch SW2 is closed, the control device 40 maintains the second switch SW2 in the closed state. In step S32, if the second switch SW2 is opened, the control device 40 maintains the second switch SW2 in the opened state, and if the second switch SW2 is closed, the control device 40 opens the second switch SW2.

According to the present embodiment described above in detail, if the difference DV between the load voltage VD and the storage battery voltage VB becomes larger than the difference threshold Zth due to an excessive voltage decrease in the first line ES1, the control device 40 closes the second switch SW2. Accordingly, if the amount of driving the loads 34 and 36 temporarily increases, power can be supplied from the second storage battery 16 to properly operate the loads 34 and 36.

[Modification Example of Eighth Embodiment]

For example, if the storage battery voltage VB is controlled at a specific voltage, it may be determined that there has occurred an anomaly involving a voltage decrease in the first line ES1, by a load voltage VD instead of the difference DV between the load voltage VD and the storage battery voltage VB. FIG. 21 is a flowchart of the control process in the present modification example. Steps described in FIG. 21 identical to the steps described in FIG. 20 are given identical step numbers for the sake of convenience, and description thereof will be omitted.

In a control process of the present modification example, If a control device 40 makes an affirmative determination in step S20, the control device 40 determines in step S148 whether the load voltage VD that is the voltage of a connection point PB detected by a first voltage detection unit 60 is smaller than a predetermined anomaly threshold Ath. The anomaly threshold Ath is the load voltage VD at which the inverse voltage of a Zener diode DT is a Zener voltage.

If the load voltage VD is smaller than the anomaly threshold Ath, the control device 40 determines that there has occurred an anomaly involving a voltage decrease in the first line ES1, and makes an affirmative determination in step S148. In this case, the control device 40 closes a second switch SW2 by a control circuit 42 in step S144, and moves to step S22. On the other hand, if the load voltage VD is larger than the anomaly threshold Ath, the control device 40 determines that there has not occurred an anomaly involving a voltage decrease in the first line ES1, and makes a negative determination in step S142. In this case, the control device 40 opens the second switch SW2 in step S146, and moves to step S22. According to the present modification example described above in detail, it is possible to produce the same advantageous effects as those of the eighth embodiment.

OTHER EMBODIMENTS

The present disclosure is not limited to the embodiments described above and may be carried out in the following manners.

The loads 34 and 36 may be devices described below, for example.

The loads 34 and 36 may be a driving motor that provides a driving motive power to the vehicle and its driving circuit. In this case, the first and second loads 34 and 36 are a three-phase permanent magnet synchronous motor and a three-phase inverter device, for example.

The loads 34 and 36 may be anti-lock brake devices that prevent the wheels from being locked at the time of braking. In this case, the first and second loads 34 and 36 are ABS actuators that can independently adjust the brake hydraulic pressure at the time of braking, for example.

The loads 34 and 36 may be cruise control devices that detect a preceding vehicle driving ahead of the own vehicle, maintain the distance to the preceding vehicle at a specific distance if the preceding vehicle is detected, and drive the own vehicle at a preset speed if the preceding vehicle becomes no longer detected. In this case, the first and second loads 34 and 36 are millimeter wave radars, for example.

The loads 34 and 36 are not necessarily required to be a combination of loads in the same configuration, and may be a combination of devices of different types that implement an equivalent function. The first and second loads 34 and 36 may not be different loads but may be identical loads. That is, the first and second loads 34 and 36 may be identical loads that are supplied with power from both the first in-line path LA1 and the second in-line path LA2.

The first power source is not limited to a converter but may be an alternator. The first power source may not have a converter but may have only the first storage battery 14, for example.

The rectifier elements provided on the second path are not limited to diodes but may be thyristors.

In the foregoing embodiment, the second storage battery 16 is charged at a higher voltage than the power supply voltage VA because, during normal operation of the first line ES1, the power supply voltage VA of the first converter 12 can be considered as equal to the load voltage VD of the second load 36. However, the present invention is not limited to this configuration. For example, in a configuration in which the load voltage VD is decreased to be lower than the power supply voltage VA by the elements provided between the first line ES1 and the second line ES2, the second storage battery 16 is charged at a higher voltage than the load voltage VD generated by the power supply voltage VA.

In the second embodiment, as a mode in which the second switch SW2 is first closed and then the first switch SW1 is opened, the timing for the control device 40 to output a command for opening the first switch SW1 is delayed to lag the timing for the control device 40 to output a command for closing the second switch SW2. However, the present invention is not limited to this configuration. For example, the timing for the control device 40 to output a command for closing the second switch SW2 and the timing for the control device 40 to output a command for opening the first switch SW1 may be equalized so that the second switch SW2 can be first closed and then the first switch SW1 can be opened by a delay of command transmission from an element such as a capacitor.

In the fifth embodiment, as an example of changing the degree of voltage boosting by the second converter 26 in accordance with the surrounding temperature of the power system 100, if the power system 100 is in a low-temperature state, the voltage of the second storage battery 16 is made higher than the power supply voltage VA. However, the present invention is not limited to this configuration. For example, as the surrounding temperature of the power system 100 is lower, the degree of voltage boosting by the second converter 26 may be increased, that is, the range of voltage boosting by the second converter 26 may be increased.

In the seventh embodiment, switches connected in parallel are provided in some of the first to third diodes DA1 to DA3 as an example. Alternatively, switches connected in parallel may be provided in all the first to third diodes DA1 to DA3.

In the seventh embodiment, for example, the first diode DA1 and the eighth switch SW8 are discrete elements connected in parallel. However, the present invention is not limited to this configuration. For example, the first diode DA1 may be a parasitic diode of the eighth switch SW8. The same thing applies to the second diode DA2 and the ninth switch SW9. The configuration in which the switches connected in parallel are provided in the first to third diodes DA1 to DA3 is not limited to the configuration illustrated in FIG. 15. For example, switches connected in parallel may be provided in the first to third diodes DA1 to DA3 in the configuration of FIG. 10.

In the seventh embodiment, the forward voltage drop amounts of the first to third diodes DA1 to DA3 are equally VF as an example. Alternatively, the forward voltage drop amounts of the didoes DA1 to DA3 may be set to different values. Accordingly, the different forward voltage drop amounts of the diodes DA1 to DA3 can be used to properly switch the voltage difference generated by the first to third diodes DA1 to DA3.

In the seventh embodiment, the difference DV between the load voltage VD and the storage battery voltage VB increases along with a decrease in the load voltage VD as an example.

However, the example of change in the difference DV is not limited to this. For example, the difference DV may vary along with a change in the storage battery voltage VB. The storage battery voltage VB varies depending on the surrounding temperature of the vehicle including the power system 100 and the degree of deterioration of the second storage battery 16, for example.

In the foregoing embodiments, the power system 100 is applied to a vehicle that is capable of manual driving and autonomous driving as an example. However, the present invention is not limited to this configuration. The power system 100 may be applied to a vehicle that is capable of only autonomous driving such as fully autonomous driving or may be applied to a vehicle that is capable of only manual driving.

For example, if the power system 100 is applied to a vehicle that is capable of only autonomous driving, in the event of an anomaly in any one of the lines ES1 and ES2, the loads 34 and 36 in the other of the lines ES1 and ES2 without the anomaly may be used to stop the vehicle by autonomous driving or move the vehicle to a safe place and then stop the vehicle.

The present disclosure has been described in accordance with the embodiments, but it should be understood that the present disclosure is not limited to the embodiments and structures.

The present disclosure also includes various modification examples and modifications within the scope of equivalence. In addition, various combinations and modes, and other combinations and modes including only one element of the foregoing combinations and modes, less or more than the one element are included in the scope and conceptual range of the present disclosure.

What is claimed is:

1. A power system comprising:
an electrical load;
a first line that includes a first power source connected to the electrical load;
a second line that includes a second power source connected to the electrical load;
an inter-line switch that is provided on a connection path connecting the first line and the second line, wherein
the first power source outputs a power supply voltage that enables driving of the electrical load, and
the second power source includes a storage battery that is chargeable by the power supply voltage of the first power source;
an anomaly determination unit that determines occurrence of an anomaly in the first line;
a state control unit that opens the inter-line switch if the anomaly determination unit determines the occurrence of an anomaly;
a first path and a second path that are provided in parallel to each other between a connection point to the connection path and the second power source in the second line;
a charging unit that is provided on the first path to charge the storage battery to a higher voltage than the power supply voltage of the first power source by power supply from the first power source; and
a discharge regulation unit that is provided on the second path to regulate discharge of the storage battery in the second line, wherein
the discharge regulation unit includes a rectifier element that regulates the flow of current from the connection point to the storage battery on the second path and generates a predetermined voltage difference between the voltage of the storage battery and the power supply voltage, and
the discharge regulation unit has a plurality of diodes connected in series as the rectifier element.

2. The power system according to claim 1, wherein
the voltage difference generated by the rectifier element is variable in the discharge regulation unit,
the power system includes a voltage difference switch unit that switches the voltage difference based on the difference between the voltage of the connection point and the voltage of the storage battery, and
the voltage difference switch unit sets the voltage difference to a larger value as the difference between the voltage of the connection point and the voltage of the storage battery is larger.

3. The power system according to claim 2, wherein
the voltage difference switch unit switches the voltage difference by changing the number of diodes that are to be conductive among the plurality of diodes between the connection point and the storage battery.

4. The power system according to claim 2, wherein
the discharge regulation unit has a plurality of diodes that is connected in parallel to one another and is different in forward voltage as the rectifier element, and
the voltage difference switch unit switches the voltage difference by changing the number of diodes that become conductive among the plurality of diodes connected in parallel.

5. The power system according to claim 1, wherein
a semiconductor switching element having a parasitic diode is provided on the second path,
the parasitic diode is the rectifier element, and
in response to the anomaly determination unit determining that there has occurred an anomaly, the state control unit brings the semiconductor switching element into the conductive state.

6. The power system according to claim 1, A power system comprising:
an electrical load;
a first line that includes a first power source connected to the electrical load;
a second line that includes a second power source connected to the electrical load;
an inter-line switch that is provided on a connection path connecting the first line and the second line, wherein
the first power source outputs a power supply voltage that enables driving of the electrical load, and
the second power source includes a storage battery that is chargeable by the power supply voltage of the first power source;
an anomaly determination unit that determines occurrence of an anomaly in the first line;
a state control unit that opens the inter-line switch if the anomaly determination unit determines the occurrence of an anomaly;
a first path and a second path that are provided in parallel to each other between a connection point to the connection path and the second power source in the second line;
a charging unit that is provided on the first path to charge the storage battery to a higher voltage than the power supply voltage of the first power source by power supply from the first power source; and
a discharge regulation unit that is provided on the second path to regulate discharge of the storage battery in the second line, wherein
the discharge regulation unit includes a rectifier element that regulates the flow of current from the connection point to the storage battery on the second path and generates a predetermined voltage difference between the voltage of the storage battery and the power supply voltage,
the second path includes a first regulation path and a second regulation path that are provided in parallel to each other,
the first regulation path is provided with the rectifier element,
the second regulation path is provided with a regulation switch that opens or closes the second regulation path,
in response to the anomaly determination unit determining that there has not occurred an anomaly, the state control unit closes the inter-line switch and opens the regulation switch, and in response to the anomaly determination unit determining that there has occurred an anomaly, the state control unit first opens the inter-line switch and then closes the regulation switch.

7. The power system according to claim 6, wherein
the second regulation path is provided with a charge permission unit that is connected in parallel to the regulation switch, regulates the flow of current from the storage battery to the connection point on the second regulation path, and permits the flow of current from the connection point to the storage battery.

8. The power system according to claim 7, wherein
the charging permission unit permits the flow of current from the connection point to the storage battery at an overvoltage time at which the voltage of the electrical load exceeds an upper limit value of the power supply voltage.

9. The power system according to claim 8, wherein
the power system is installed in a vehicle,
the electrical load includes a steering load that controls steering of the vehicle, and
the overvoltage time includes a driving time of the steering load.

10. The power system according to claim 8, wherein
the storage battery is a second-line storage battery,
the first power source includes:
a voltage generation unit that generates the power supply voltage; and
a first-line storage battery that is chargeable by the power supply voltage of the voltage generation unit, and
the overvoltage time includes a switching time of the first-line storage battery from a state of being connected to the first line to a state of being disconnected from the first line.

11. The power system according to claim 7, wherein
the regulation switch has a first changeover switch and a second changeover switch connected in series,
the charging permission unit is connected in parallel to only the first changeover switch,
in response to the anomaly determination unit determining that there has not occurred an anomaly and the storage battery is not being charged by the power supply voltage of the first power source, the state control unit opens the regulation switch by opening the first changeover switch and closing the second changeover switch, and
in response to the anomaly determination unit determining that there has not occurred an anomaly and the storage battery is being charged by the power supply voltage of the first power source, the state control unit opens the regulation switch by opening the first changeover switch and the second changeover switch.

12. The power system according to claim 6, wherein
the regulation switch is a first regulation switch,
the first regulation path is provided with a second regulation switch that is connected in series to the rectifier element to open or close the first regulation path,
in response to the anomaly determination unit determining that there has not occurred an anomaly and the storage battery is not being charged by the power supply voltage of the first power source, the state control unit closes the second regulation switch, and
in response to the anomaly determination unit determining that there has not occurred an anomaly and the storage battery is being charged by the power supply voltage of the first power source, the state control unit opens the second regulation switch.

13. A power system comprising:

an electrical load;

a first line that includes a first power source connected to the electrical load;

a second line that includes a second power source connected to the electrical load;

an inter-line switch that is provided on a connection path connecting the first line and the second line, wherein the first power source outputs a power supply voltage that enables driving of the electrical load, and the second power source includes a storage battery that is chargeable by the power supply voltage of the first power source;

an anomaly determination unit that determines occurrence of an anomaly in the first line;

a state control unit that opens the inter-line switch if the anomaly determination unit determines the occurrence of an anomaly;

a first path and a second path that are provided in parallel to each other between a connection point to the connection path and the second power source in the second line;

a charging unit that is provided on the first path to charge the storage battery to a higher voltage than the power supply voltage of the first power source by power supply from the first power source; and a discharge regulation unit that is provided on the second path to regulate discharge of the storage battery in the second line, wherein the discharge regulation unit includes a rectifier element that regulates the flow of current from the connection point to the storage battery on the second path and generates a predetermined voltage difference between the voltage of the storage battery and the power supply voltage, the charging unit is a booster circuit that boosts the power supply voltage, the power system includes a boost control unit that causes the booster circuit to boost the voltage if a boost condition indicating the necessity of bringing the storage battery into a high voltage is satisfied, and the boost control unit changes degree of boosting the voltage by the booster circuit in accordance with a surrounding temperature of the power system.

14. The power system according to claim 10, wherein the power system is installed in a vehicle, the electrical load is a load that performs at least one function necessary for driving the vehicle and is a load that performs a driving assistance function of the vehicle, the vehicle is capable of driving in a first mode using the driving assistance function and driving in a second mode not using the driving assistance function, and if driving mode of the vehicle is the first mode, the boost control unit determines that the boost condition is satisfied and causes the booster circuit to boost the voltage.

15. The power system according to claim 1, wherein the power system is installed in a vehicle, the electrical load is a load that performs at least one function necessary for driving the vehicle and is a load that performs a driving assistance function of the vehicle, the vehicle is capable of driving in a first mode using the driving assistance function and driving in a second mode not using the driving assistance function, and the power system includes a mode control unit that, on a condition that voltage of the storage battery is higher than the power supply voltage of the first power source by a predetermined value or more, permits a driving mode of the vehicle to be switched from the second mode to the first mode.

* * * * *